United States Patent [19]

Takagi et al.

[11] Patent Number: 5,440,535
[45] Date of Patent: Aug. 8, 1995

[54] METHOD OF COUNTING TRACKS ON DISK AND TRACK COUNTER CIRCUIT THEREFOR

[75] Inventors: Naoyuki Takagi, Fuwa; Osamu Ota, Ibi, both of Japan

[73] Assignee: Sanyo Electric Co., Ltd., Osaka, Japan

[21] Appl. No.: 251,563

[22] Filed: May 31, 1994

[30] Foreign Application Priority Data

Jun. 15, 1993 [JP] Japan .................................. 5-143741

[51] Int. Cl.⁶ .............................................. G11B 7/085
[52] U.S. Cl. ............................. 369/44.28; 369/44.37; 369/58
[58] Field of Search ............... 369/44.28, 44.29, 44.34, 369/44.37, 44.38, 44.25, 124, 32, 58; 250/201.5

[56] References Cited

U.S. PATENT DOCUMENTS

| | | | |
|---|---|---|---|
| 4,929,822 | 5/1990 | Wakamura et al. | 369/44.37 X |
| 5,313,440 | 5/1994 | Füldner et al. | 369/44.28 X |
| 5,327,410 | 7/1994 | Gleim et al. | 369/44.28 |

OTHER PUBLICATIONS

M. Ogawa et al., "Rapid Access method Using ISO Optical Disk", Extended *Abstracts (The 50th Autumn Meeting, 1989), The Japan Society of Applied Physics,* No. 3, p. 977 (Japanese public, and English transl.).

*Primary Examiner*—W. R. Young
*Assistant Examiner*—Thang V. Tran
*Attorney, Agent, or Firm*—Peter L. Michaelson

[57] ABSTRACT

The present track counter circuit is employed for a disk player of three-beam type. The track counter circuit includes a pickup having three sensors, two differential amplifiers, two zero cross detectors, an OR circuit and a counter. The first sensor is divided into two, and receives light reflected from a beam spot formed by a main beam. The outputs of the two sensor portions are applied to a first differential amplifier, the output of which is applied to a first zero cross detector. A second sensor receives light reflected from a beam spot formed by a sub beam, and a third sensor receives light reflected from a beam spot formed by another sub beam. The outputs of the second and third sensors are applied to a second differential amplifier, the output of which is applied to a second zero cross detector. The outputs of first and second zero cross detectors are applied to the OR circuit, and the counter counts crossing pulses therein in response to the OR output. Thus, even if the beam spot by the main beam passes between pits, a dropout track crossing pulse can be supplemented and the number of tracks the pickup has crossed can be accurately counted.

16 Claims, 22 Drawing Sheets t = t3 t = t2 t = t1

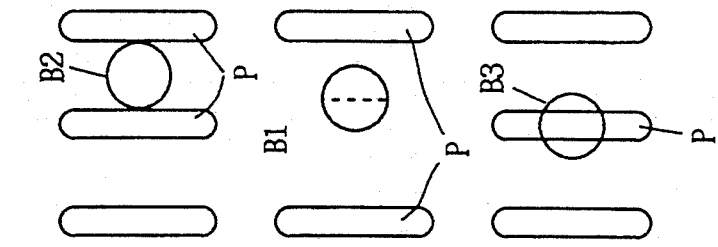
FIG. 4C  t = t6
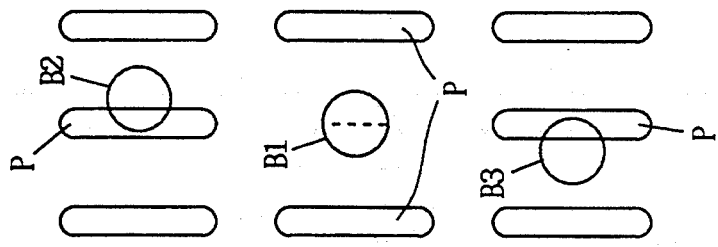
FIG. 4B  t = t5
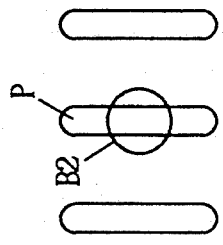
FIG. 4A  t = t4

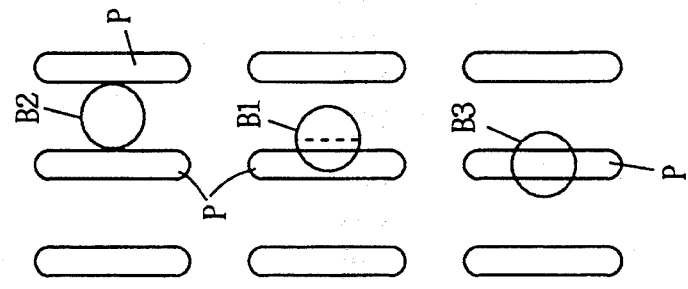
FIG. 11C t = t3
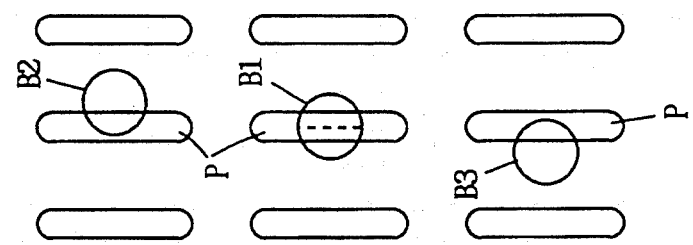
FIG. 11B t = t2
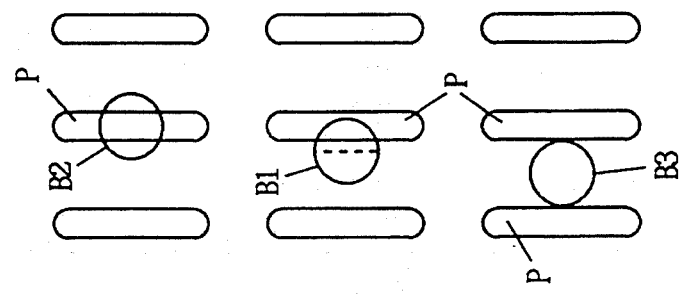
FIG. 11A t = t1

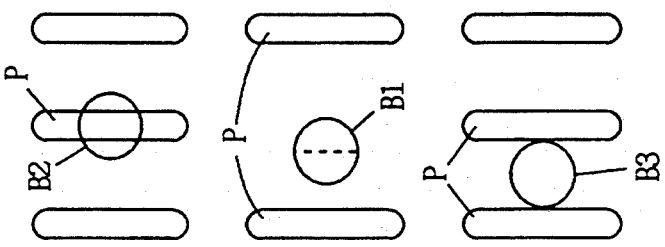
FIG. 12C  t = t6
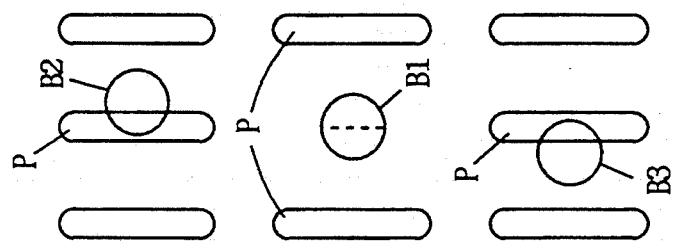
FIG. 12B  t = t5
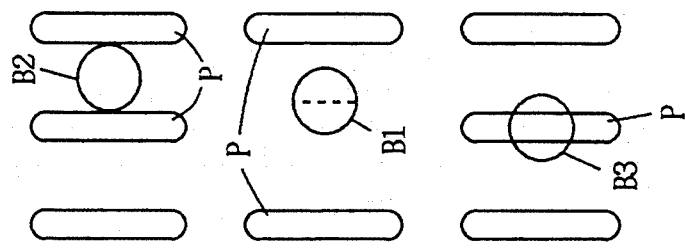
FIG. 12A  t = t4

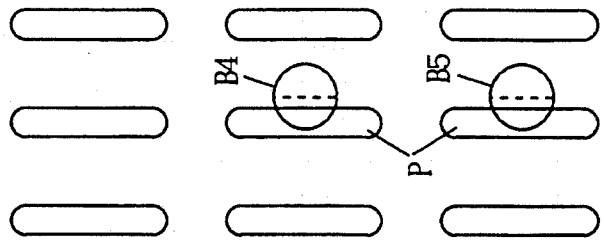
FIG. 16C  t = t3
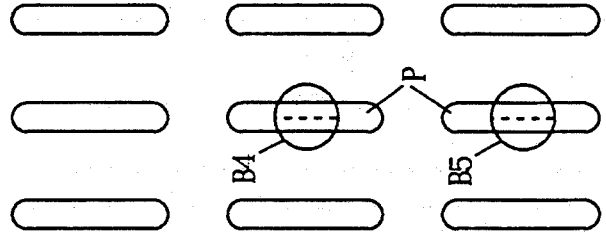
FIG. 16B  t = t2
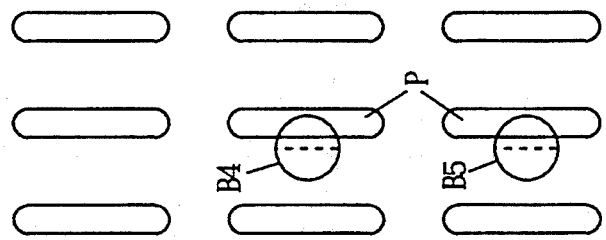
FIG. 16A  t = t1

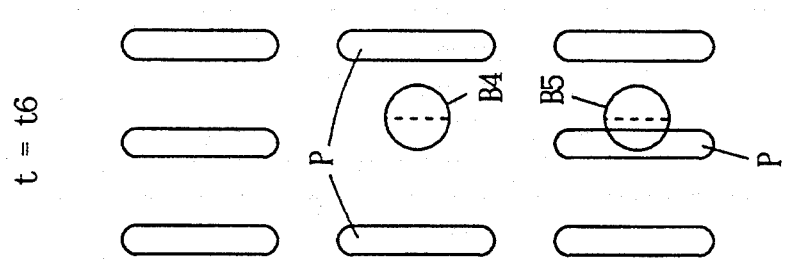
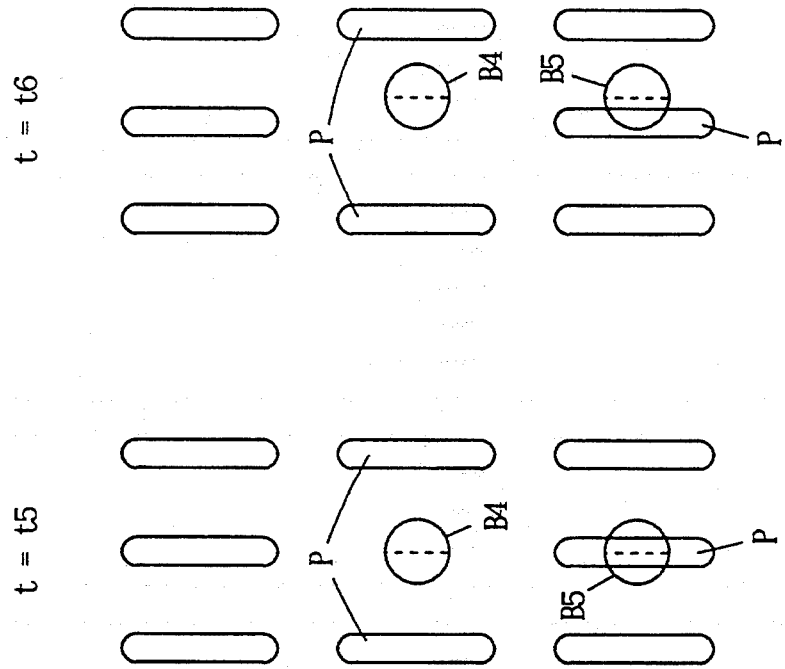
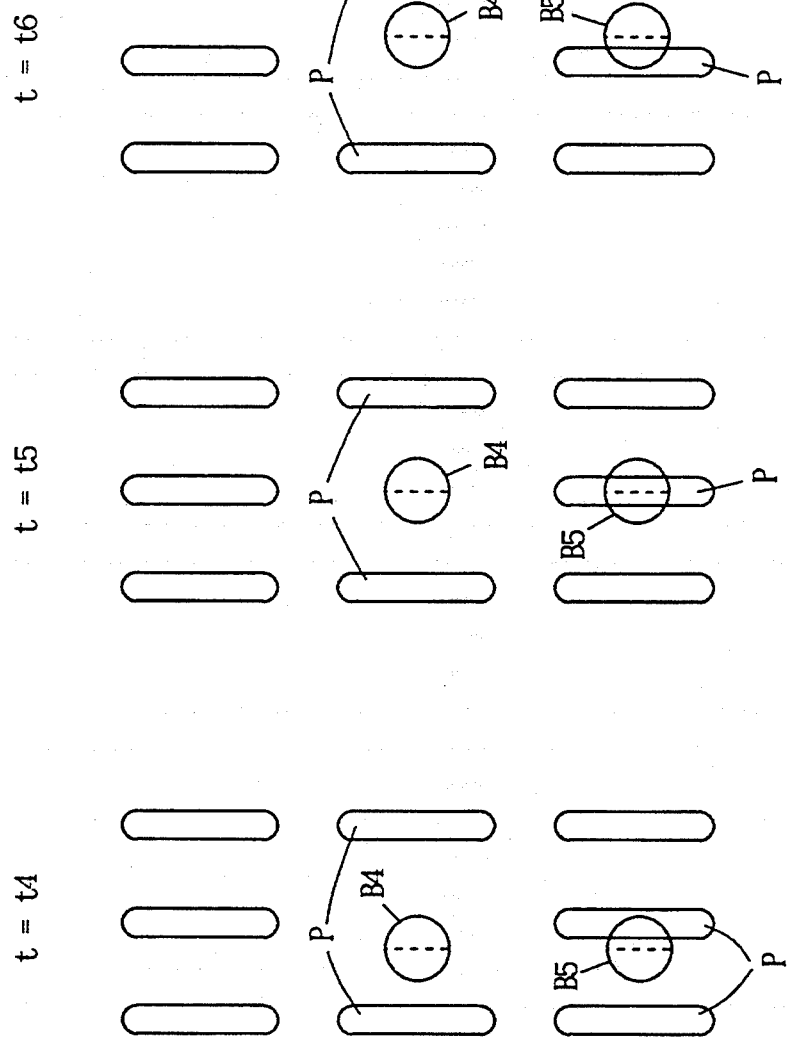
FIG. 17A  t = t4
FIG. 17B  t = t5
FIG. 17C  t = t6 t = t3 t = t2 t = t1

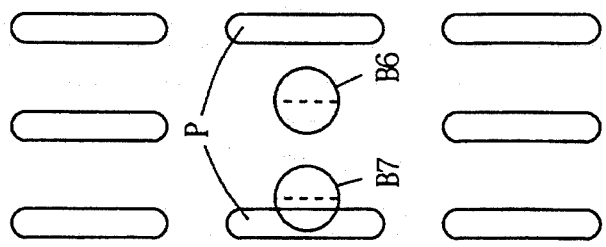
FIG. 22A t=t4
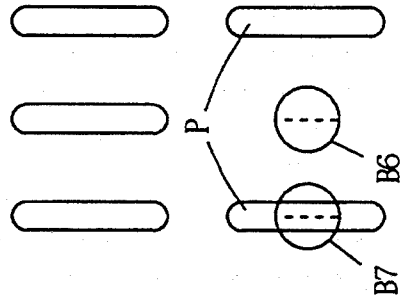
FIG. 22B t=t5
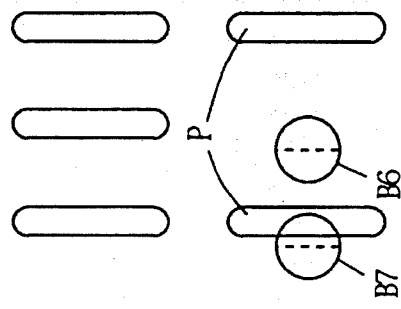
FIG. 22C t=t6

METHOD OF COUNTING TRACKS ON DISK AND TRACK COUNTER CIRCUIT THEREFOR

BACKGROUND OF THE INVENTION

1. Field of the Invention

The present invention relates generally to methods of track counting for a disk player and track counter circuits therefor, and more specifically, to a method of accurately counting the number of tracks a pickup has crossed and a circuit therefor, in an optical disk player which scans an optical disk across the tracks with a plurality of laser beams.

2. Description of the Background Art

In order to selectively reproduce a desired item from a compact disk for music which records a plurality of music items, the pickup must be quickly moved on the first track from which the item starts. While the pickup is thus moved to a prescribed position on the disk across the tracks, a reproduction output obtained by a reproduction beam is detected, and the number of tracks the pickup has crossed is counted in response to changes in the level of the detected reproduction signal. Stopping the pickup once the number of counted tracks reaches a prescribed number permits the pickup to move quickly to the first track from which the desired item is recorded.

In this case, however, since the pickup moves at a high speed and pits are intermittently formed on the track, a reproduction beam sometimes passes spaces between pits without irradiating the pits. At the time, the number of tracks the pickup has crossed is erroneously counted, and therefore the pickup cannot be stationed accurately at a desired position.

A method for solving such a problem disclosed in Extended Abstracts (The 50th Autumn Meeting, 1989); The Japan Society of Applied Physics, No. 3, page 977 takes advantage of the periodicity of track crossing pulses generated in response to changes in the level of a reproduction signal and supplements a dropped out pulse when the periodicity is disturbed by the dropped out crossing pulse. If the pickup accesses at a high speed, however, a series of crossing pulses often drop out, and completely supplementing such dropout pulses would not be possible.

SUMMARY OF THE INVENTION

The present invention provides for the above-described problem and it is an object of the invention to provide a disk player capable of quickly retrieving desired information among a plurality of pieces of information recorded on a disk.

Another object of the invention is to provide a disk player capable of accurately retrieving desired information among a plurality of pieces of information recorded on a disk.

Yet another object of the invention is to provide a track counter circuit capable of accurately counting the number of tracks a pickup has crossed.

A still further object of the invention is to provide a track counter circuit capable of accurately counting the number of tracks a pickup has crossed even if the pickup accesses at a high speed.

A still further object of the invention is to completely supplement track crossing pulses which drops out because an optical beam has passed spaces between pits.

An additional object of the present invention is to implement such a track counter circuit in a simple circuit configuration.

A method of counting tracks on a disk according to one aspect of the invention includes the steps of scanning the disk transversely of the tracks with a plurality of optical beams, receiving first reflected light from one of a plurality of beam spots formed on a disk surface by the plurality of optical beams, receiving second reflected light from another one of the plurality of beam spots, producing a first signal formed of a plurality of pulses in response to the first reflected light, producing a second signal formed of a plurality of pulses in response to the second reflected light, supplementing the first signal with a pulse included in the second signal if the first signal does not include a certain pulse and the pulse of the second signal corresponds to that certain pulse, and counting the pulses thus supplemented first signal.

A track counter circuit for a disk player scanning a disk transversely of the tracks with a plurality of optical beams according to another aspect of the invention includes first and second light receiving elements, first and second signal generators, a supplementing element and a counter. The first light receiving element receives light reflected from at least one of a plurality of beam spots formed by the plurality of optical beams on a disk surface. The second light receiving element receives light reflected from at least another one of the plurality of beam spots. The first signal generator generates a first signal formed of a plurality of pulses in response to the first light receiving element. The second signal generator generates a second signal formed of a plurality of pulses in response to the second light receiving element. The supplementing element supplements the first signal with a pulse included in the second signal when the first signal does not include a certain pulse and the pulse of the second signal corresponds to that certain pulse. The counter counts the pulses of the first signal supplemented by the supplementing element.

In the track counter circuit, the first light receiving element preferably includes first and second sensors. The first and second sensors receive light reflected from a first beam spot of the plurality of beam spots. The first sensor receives light reflected from a half of the first beam spot on the outer side of the disk, and the second sensor receives light reflected from the remaining half of the first beam spot on the inner side of the disk. The second light receiving element includes third and fourth sensors. The third sensor receives light reflected from a second beam spot placed apart from the first beam spot at a prescribed distance in one direction in which the tracks run and at a prescribed distance in one direction crossing the tracks. The fourth sensor receives light reflected from a third beam spot placed apart from the first beam spot at a prescribed distance in the other direction in which the tracks run and at a prescribed distance in the opposite direction crossing the tracks. The first signal generator includes a first comparator and a first zero cross detector circuit. The first comparator compares the output of first sensor and the output of second sensor. The first zero cross detector circuit, in response to the first comparator, generates one pulse when the output of first sensor is reduced and the output of the second sensor increases or the output of first sensor increases and the output of second sensor is reduced to such a level that the outputs of first and second sensors are equal to each other. The second signal generator includes a second comparator and a second zero cross detector circuit. The second comparator compares the output of third sensor and the output of fourth sensor. The second zero cross detector circuit, in response to the second comparator, generates one pulse when the output of third sensor is reduced and the output of fourth sensor increases or the output of third sensor increases and the output of fourth sensor is reduced to such a level that the outputs of third and fourth sensors are equal to each other.

The track counter circuit preferably further includes a third light receiving element and a third signal generator. The third light receiving element receives light reflected from at least another one of the plurality of beam spots. The third signal generator generates a third signal formed of a plurality of pulses in response to the third light receiving element. The supplementing element supplements the first signal with a pulse included in the third signal when the first signal does not include a certain pulse and the pulse of the third signal corresponds to that certain pulse.

In the track counter circuit, the first light receiving element preferably includes first and second sensors. The first and second sensors receive light reflected from a first beam spot of a plurality of beam spots. The first sensor receives light reflected from a half of the first beam spot on the outer side of the disk, and the second sensor receives light reflected from the remaining half of the first beam spot on the inner side. The second light receiving element includes a third sensor. The third sensor receives light reflected from a second beam spot placed apart from the first beam spot at a prescribed distance in one direction in which the tracks run and at ¼ the track pitch in one direction crossing the tracks. The first signal generator includes a first comparator and a first zero cross detector circuit. The first comparator compares the output of first sensor and the output of second sensor. The first zero cross detector circuit, in response to the first comparator, generates one pulse at a first timing when the output of first sensor is reduced and the output of second sensor increases to such a level that the outputs of first and second sensors are equal to each other or at a second timing when the output of first sensor increases and the output of second sensor is reduced to such a level that the outputs of first and second sensors are equal to each other. The second signal generator includes a first filter and a second zero cross detector circuit. The first filter removes DC component from the output of third sensor. The second zero cross detector circuit generates one pulse when the output of first filter increases to zero in the first case in which the first zero cross detector circuit generates the pulse at the first timing, and generates one pulse when the output of first filter is reduced to zero in the second case in which the first zero cross detector circuit generates the pulse at the second timing. The third light receiving element includes a fourth sensor. The fourth sensor receives light reflected from a third beam spot placed apart from the first beam spot at a prescribed distance in the other direction in which the tracks run, and at ¼ the track pitch in the opposite direction crossing the tracks. The third signal generator includes a second filter and a third zero cross detector circuit. The second filter removes a DC component from the output of fourth sensor. The third zero cross detector circuit generates one pulse when the output of second filter is reduced to zero in the first case, and generates one pulse when the output of second filter increases to zero in the second case.

In the track counter circuit, the first light receiving element preferably includes first and second sensors. The first and second sensors receive light reflected from a first beam spot of the plurality of beam spots. The first sensor receives light reflected from a half of the first beam spot on the outer side of the disk, and the second sensor receives light reflected from the remaining half of the first beam spot on the inner side. The second light receiving element includes third and fourth sensors. The third and fourth sensors receive light reflected from a second beam spot of the plurality of beam spots. The third sensor receives light reflected from a half of the second beam spot on the outer side of the disk, and the fourth sensor receives the remaining half of the second beam spot on the inner side. The first signal generator includes a first comparator and a first zero cross detector circuit. The first comparator compares the output of first sensor and the output of second sensor. The first zero-cross detector circuit, in response to the first comparator, generates one pulse when the output of first sensor is reduced and the output of second sensor increases or the output of first sensor increases and the output of second sensor is reduced to such a level that the outputs of first and second sensors are equal to each other. The second signal generator includes a second comparator and a second zero cross detector circuit. The second comparator compares the output of third sensor and the output of fourth sensor. The second zero cross detector circuit, in response to the second comparator, generates one pulse when the output of third sensor is reduced and the output of fourth sensor increases or the output of third sensor increases and the output of fourth sensor is reduced to such a level that the outputs of third and fourth sensors are equal to each other.

According to the invention, when a first signal generated by the first signal generator does not include a certain pulse, and a second signal generated by the second signal generator includes a pulse corresponding to the certain pulse, the first signal is supplemented with the pulse included in the second signal. Thus, even if one optical beam passes spaces between pits, the number of tracks the pickup has crossed can be accurately counted.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A, 4B and 4C are plan views for use in illustration of the operation of the track counter circuit shown in FIG. 1, time-sequentially showing a disk surface when a beam spot by a main beam passes spaces between pits;

1 corresponding to the states shown in FIGS. 3A, 3B, 3C, 4A, 4B and 4C.

Figure 1:
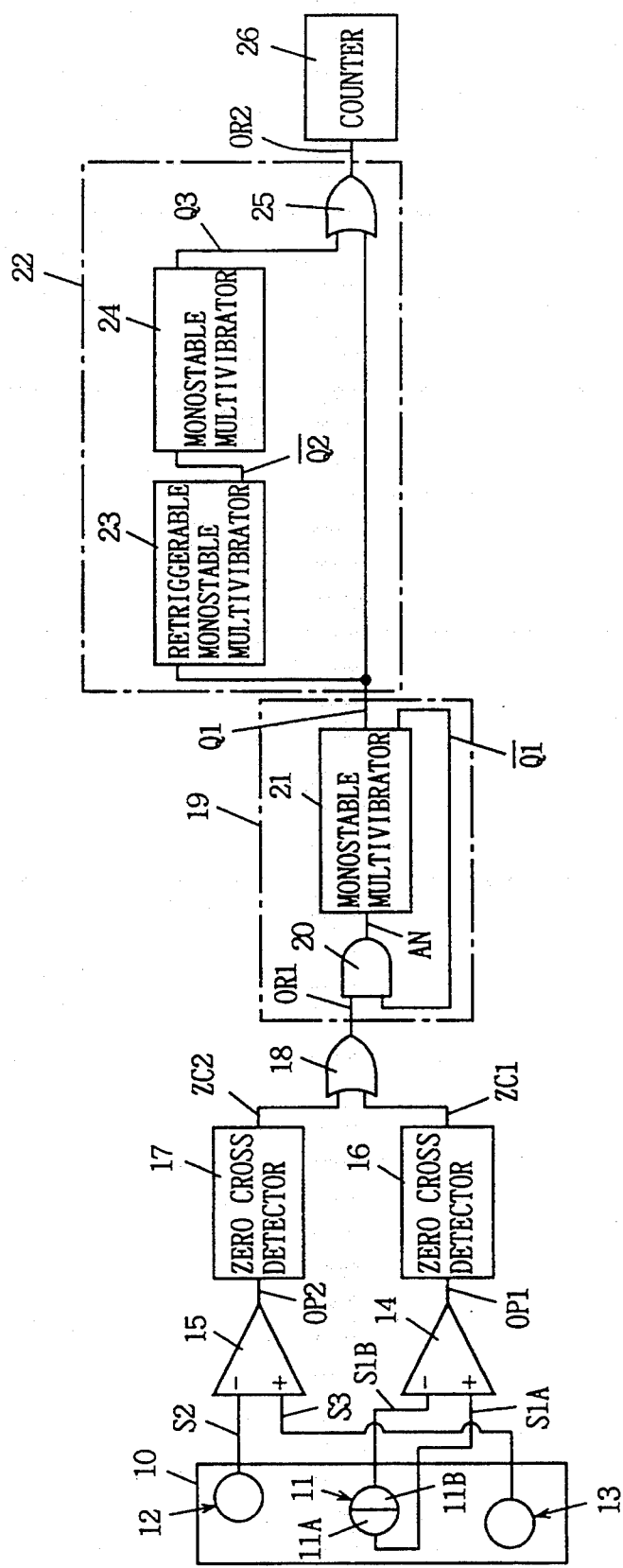
FIG. 1 is a block diagram showing the configuration of an entire track counter circuit according to a first embodiment of the invention.
Figure 6:
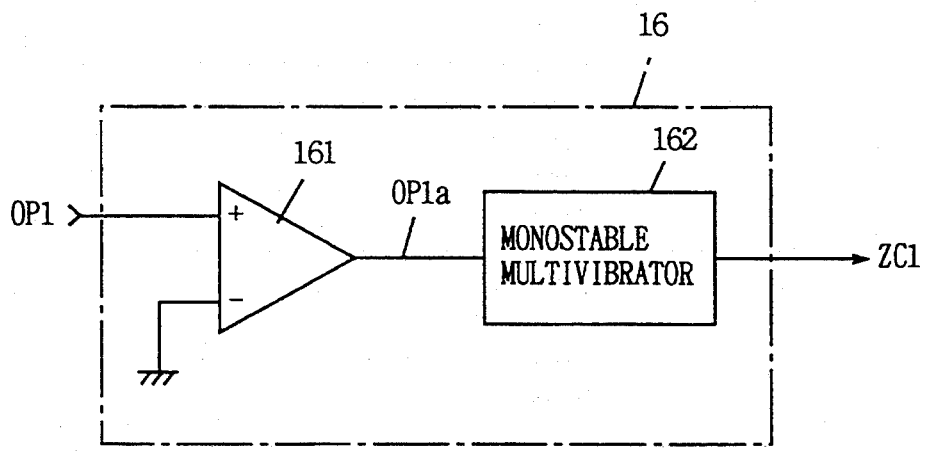
Figure 7:
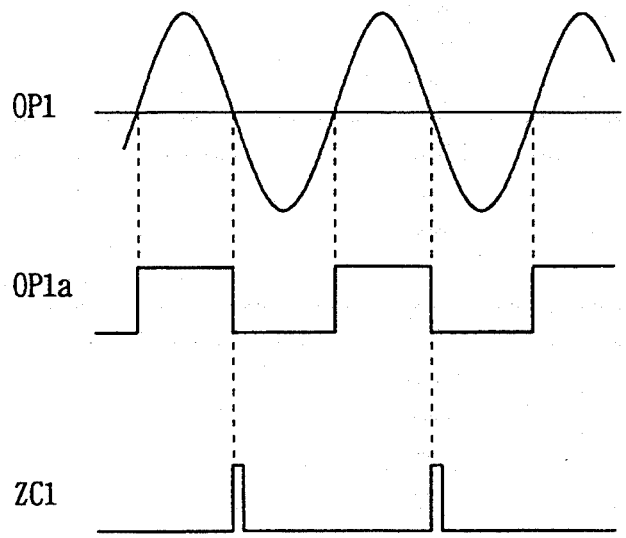
Figure 8:
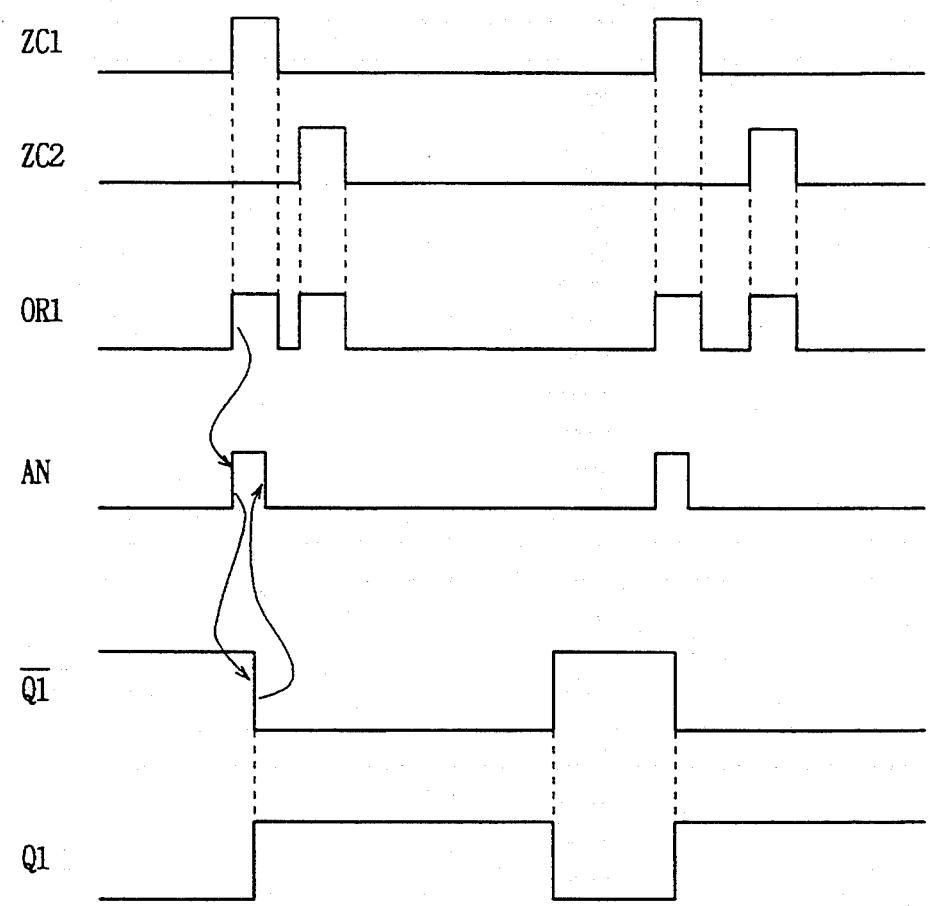
Figure 9:
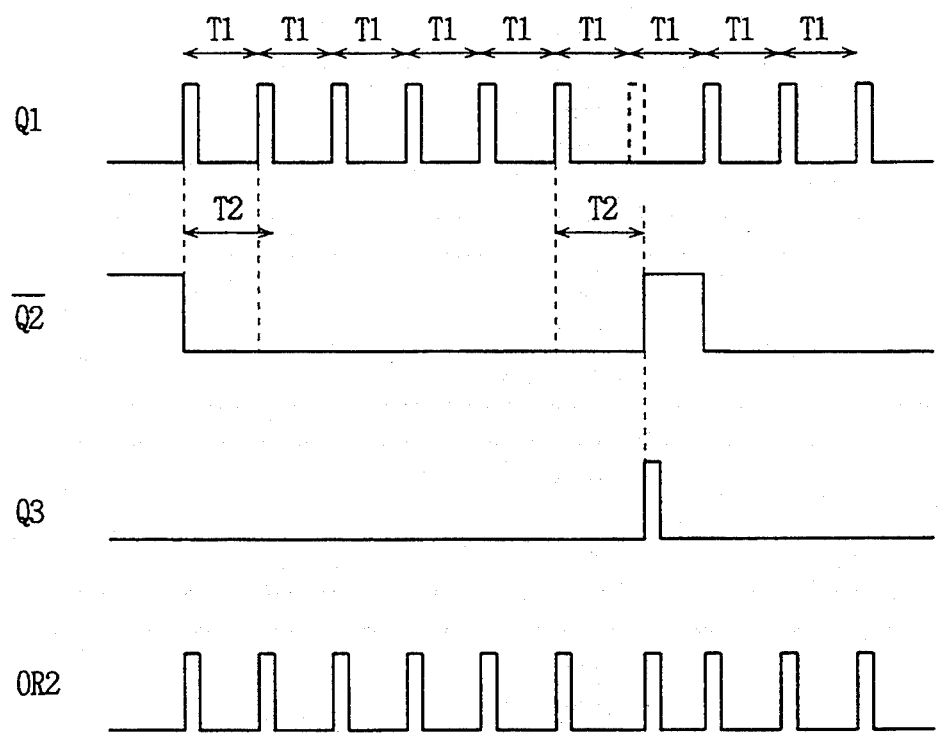
Figure 10:
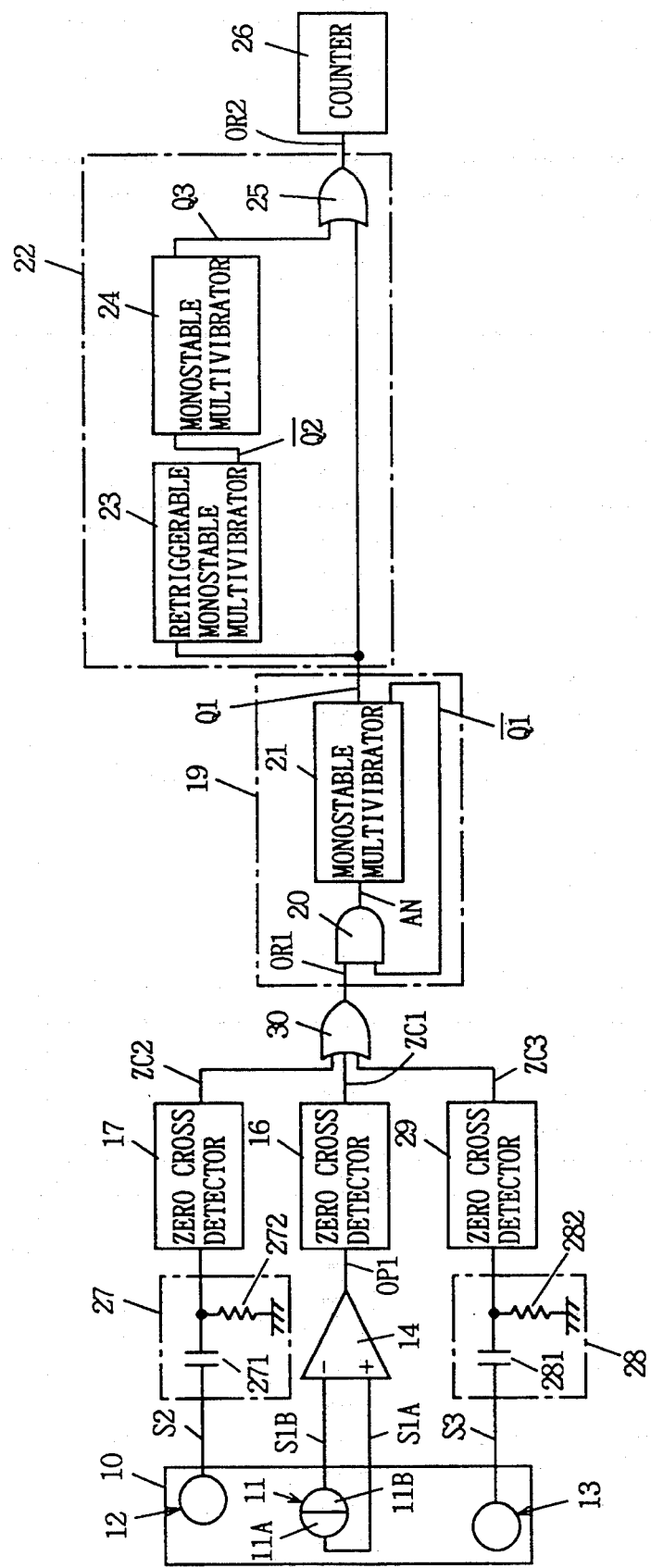
Figure 13:
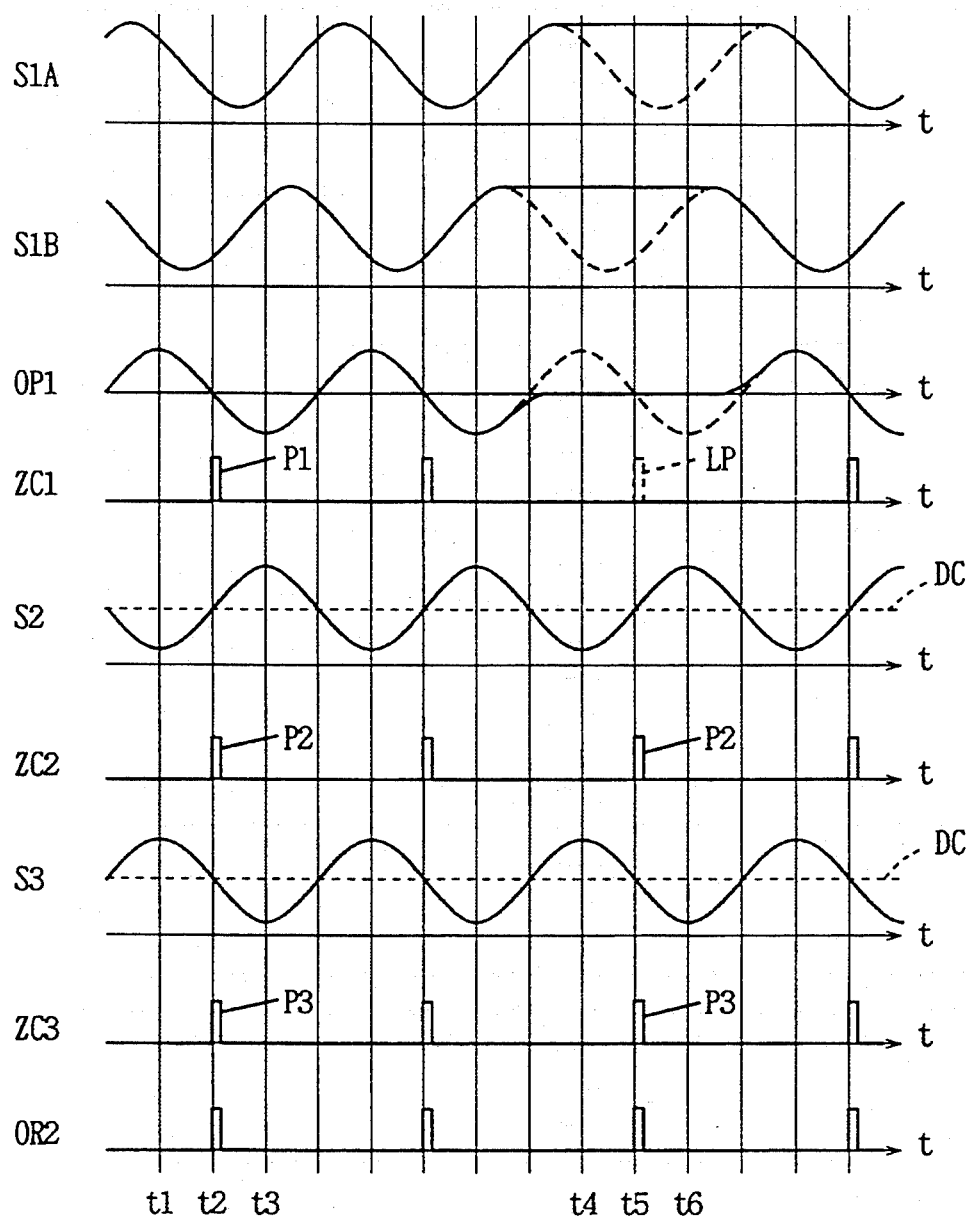

FIG. 6 is a block diagram showing in detail the configuration of a zero cross detector in the track counter circuit shown in FIG. 1;

FIG. 7 is a timing chart showing the operation of the zero cross detector shown in FIG. 6;

FIG. 8 is a timing chart showing the operation of a double pulse removing portion in the track counter circuit shown in FIG. 1;

FIG. 9 is a timing chart showing the operation of a periodic pulse supplementing portion in the track counter circuit shown in FIG. 1;

FIG. 10 is a block diagram showing the configuration of an entire track counter circuit according to a second embodiment of the invention;

FIGS. 11A, 11B and 11C are plan views for use in illustration of the operation of the track counter circuit shown in FIG. 10, time-sequentially showing a disk surface when a beam spot by a main beam crosses pits;

FIGS. 12A, 12B and 12C are plan views for use in illustration of the operation of the track counter circuit shown in FIG. 10, time-sequentially showing a disk surface when a beam spot by a main beam passes spaces between pits;

FIG. 13 is a timing chart showing waveforms of output signals from the track counter circuit shown in FIG. 10 corresponding to the states shown in FIGS. 11A, 11B, 11C, 12A, 12B, and 12C.

Figure 14:
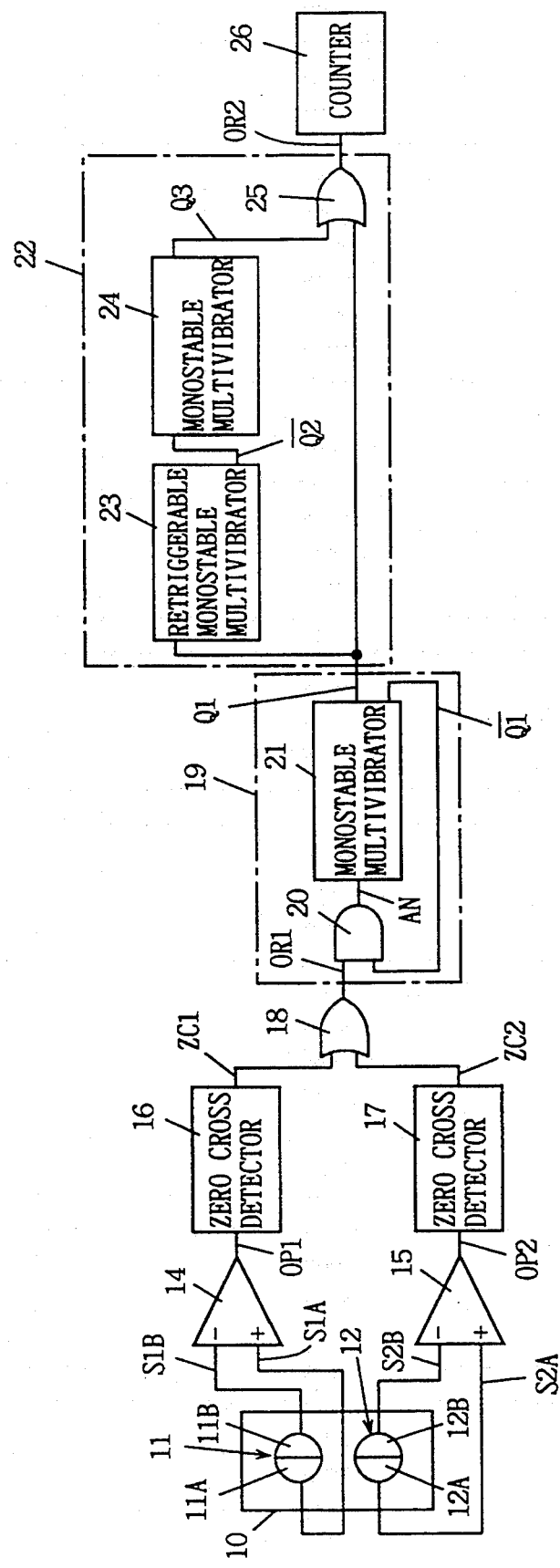
Figure 15:
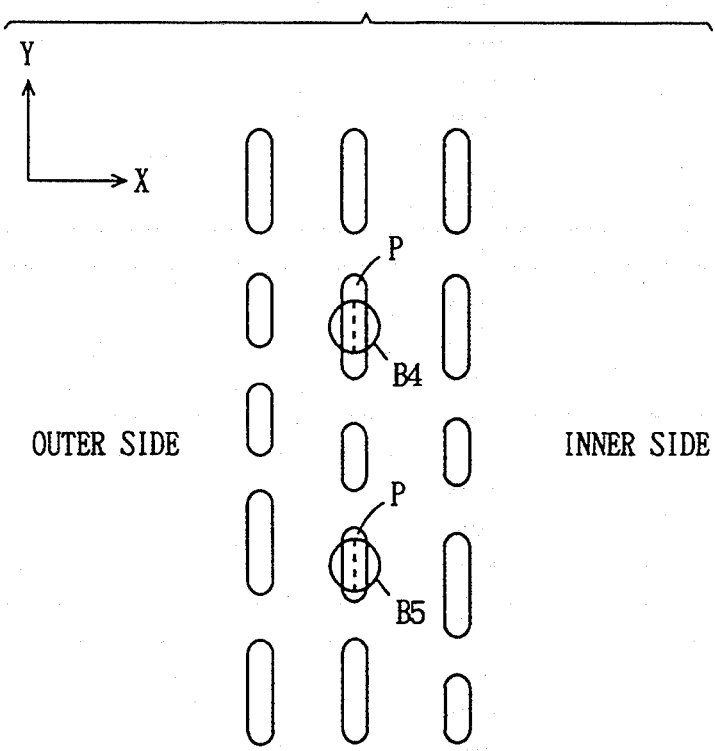
Figure 18:
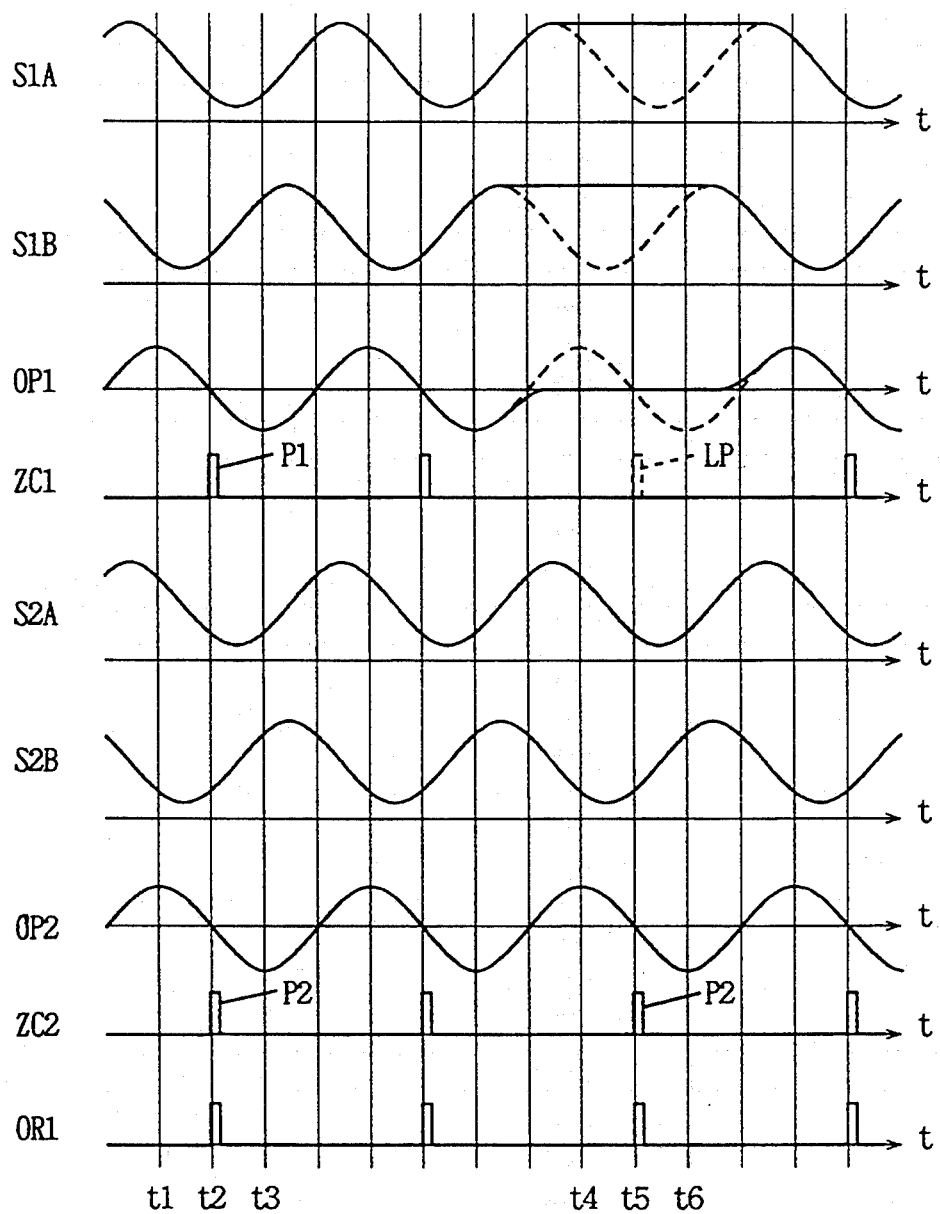
Figure 19:
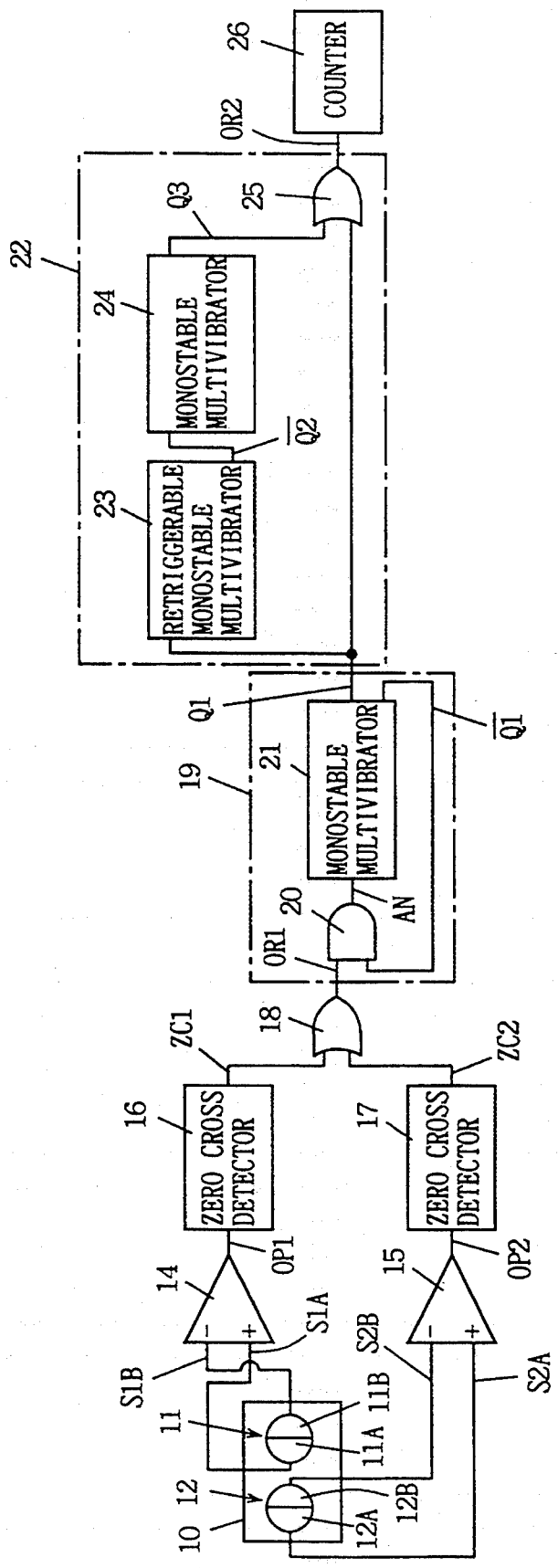
Figure 20:
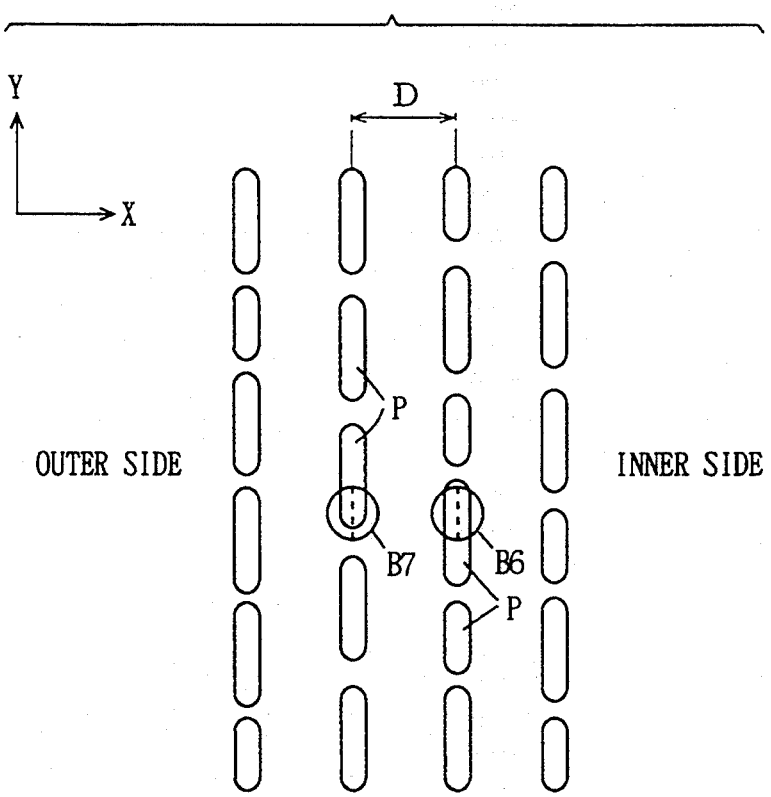
Figure 21C:
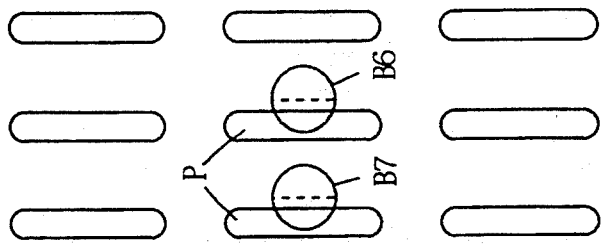
Figure 21B:
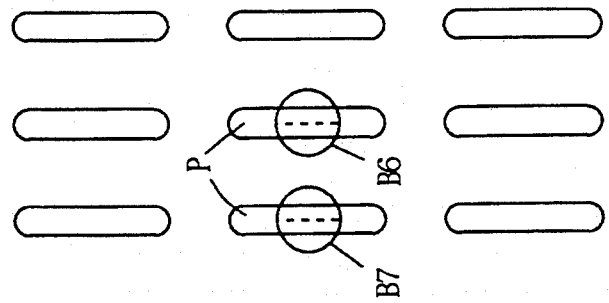
Figure 21A:
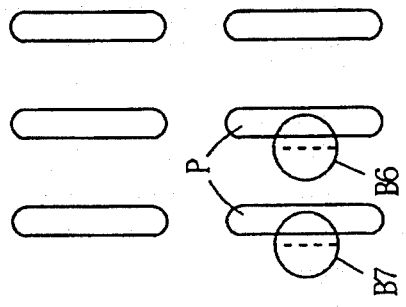
Figure 23:
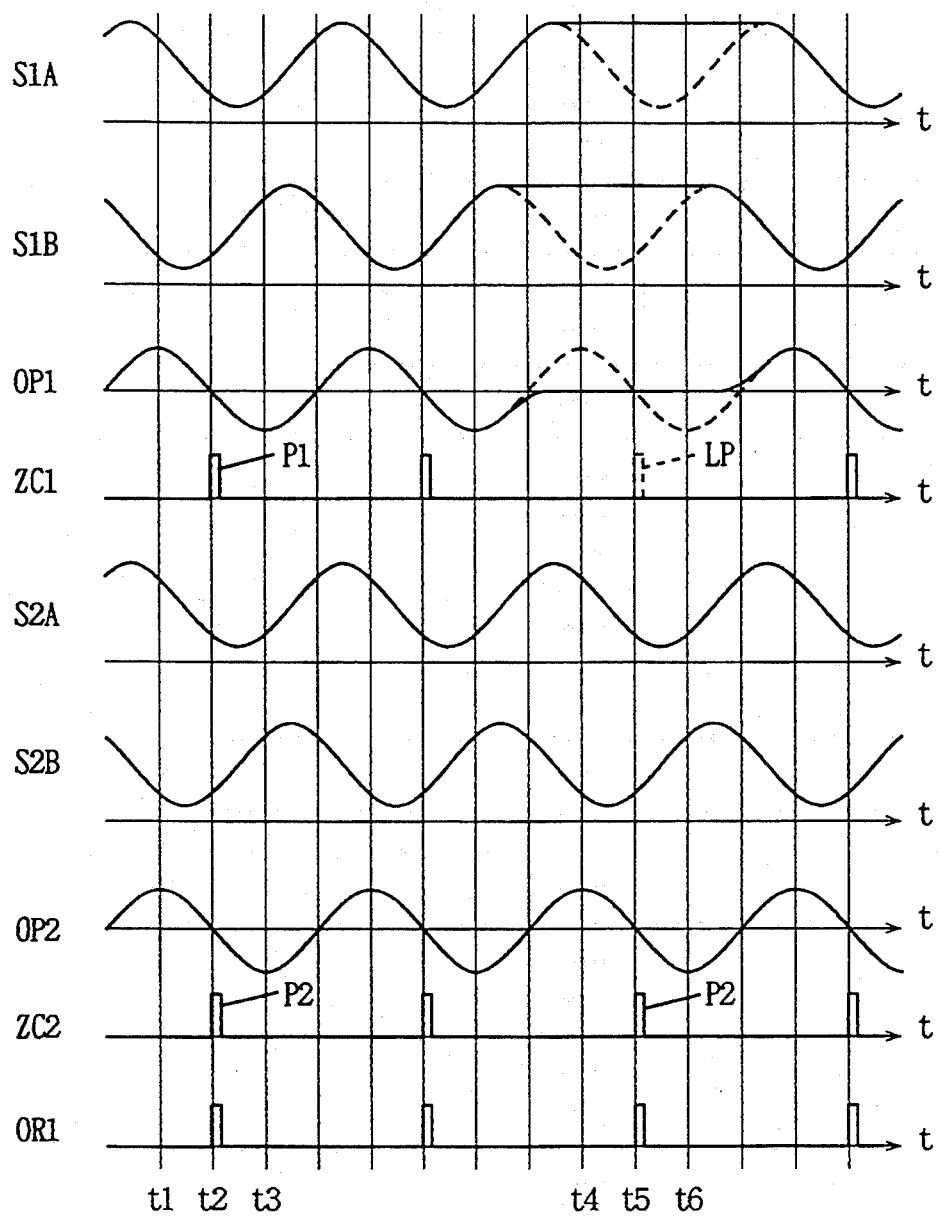

FIG. 14 is a block diagram showing the configuration of an entire track counter circuit according to a third embodiment of the invention;

FIG. 15 is a plan view showing part of a disk irradiated with two beam spots in a two-beam type disk player;

FIGS. 16A, 16B and 16C are plan views for use in illustration of the operation of the track counter circuit shown in FIG. 14, time-sequentially showing a disk surface when beam spots both crosses pits;

FIGS. 17A, 17B and 17C are plan views for use in illustration of the operation of the track counter circuit shown in FIG. 14, time-sequentially showing a disk surface when one beam spot passes spaces between pits;

FIG. 18 is a timing chart showing waveforms of output signals from the track counter circuit shown in FIG. 14 corresponding to the states shown in FIGS. 16A, 16B, 16C, 17A, 17B, and 17C;

FIG. 19 is a block diagram showing the configuration of an entire track counter circuit according to a fourth embodiment of the invention;

FIG. 20 is a plan view showing part of a disk irradiated with two beam spots in a two-channel reproduction type disk player;

FIGS. 21A, 21B and 21C are plan views for use in illustration of the operation of the track counter circuit shown in FIG. 19, time-sequentially showing a disk surface when beam spots both cross pits;

FIGS. 22A, 22B and 22C are plan views for use in illustration of the operation of the track counter circuit shown in FIG. 19, time-sequentially showing a disk surface when one beam spot passes spaces between pits; and FIG. 23 is a timing chart showing waveforms of output signals from the track counter circuit shown in FIG. 19 corresponding to the states shown in FIGS. 21A, 21B, 21C, 22A, 22B and 22C.

DESCRIPTION OF THE PREFERRED EMBODIMENTS

Now, preferred embodiments of the invention will be described in detail in conjunction with the accompanying drawings. Note that the same reference characters denote the same or corresponding portions.

[First Embodiment]

FIG. 1 is a block diagram showing the configuration of an entire track counter circuit in a disk player according to a first embodiment of the invention. The track counter circuit is an application of the present invention to a so-called three-beam type compact disk player. In the following description of embodiments, the present invention is applied to a compact disk player, but the invention is also applicable to magneto-optical disk drives or the like.

In the three-beam type compact disk player, one laser beam produced by a semiconductor laser (not shown) is separated into one main beam and two sub beams through a diffraction grating (not shown).

Figure 2:
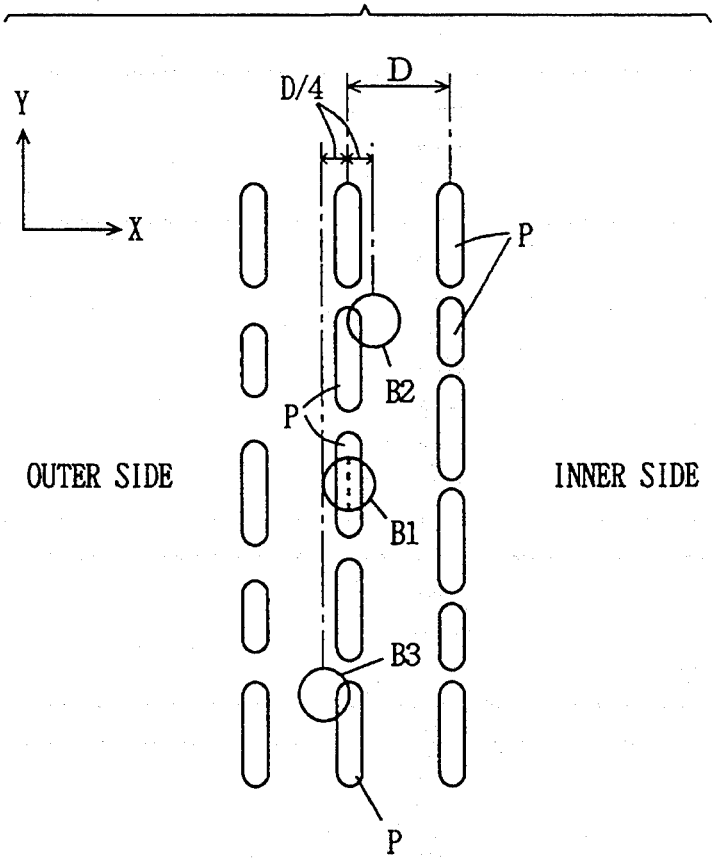
FIG. 2 is a plan view showing part of a disk irradiated with three beam spots in a three-beam type disk player.

As illustrated in FIG. 2, a plurality of pits P are intermittently formed on each track of an optical disk. In a normal reproduction mode, the main beam is usually directed to the center of a track, and a beam spot B1 is formed as a result. One sub beam is directed at a position in the front (the upper side in the figure) and ¼ the track pitch D/4 shifted inward (rightward in the figure) from the center of the track, and a beam spot B2 is formed as a result. The other sub beam is directed to a position in the back (the lower side in the figure) of the main beam and ¼ the track pitch D/4 shifted outward (leftward in the figure) from the center of the track, and a beam spot B3 is formed as a result.

In a normal reproduction mode, a reproduction signal is generated in response to light reflected from beam spot B1 by the main beam. Meanwhile, light reflected from beam spots B2 and B3 by the sub beams are differentially amplified for producing a tracking error signal. At the time, if beam spots B1 to B3 shift inward, light reflected from beam spot B2 increases and light reflected from beam spot B3 decreases. In response to a tracking error signal generated at the time, beam spot B1 is returned to the center of the track. If beam spots B1 to B3 are shifted outward on the other hand, light reflected from beam spot B2 decreases and light reflected from beam spot B3 increases. In response to a track error signal generated at the time, beam spot B1 is returned to the center of the track. Accordingly, in the normal reproduction mode, beam spot B1 by the main beam can always trace the center of the track.

Now, the configuration of the track counter circuit according to the first embodiment will be described. Referring to FIG. 1, the track counter circuit includes a pickup 10 having three optical sensors 11 to 13, differential amplifiers 14 and 15 connected to sensors 11 to 13, respectively, and zero cross detectors 16 and 17 connected to differential amplifiers 14 and 15, respectively.

Sensor 11 is divided into two sensor portions 11A and 11B. Sensor portion 11A receives light reflected from the outer half of beam spot B1 shown in FIG. 2 through a lens (not shown). Sensor portion 11B receives light reflected from the inner half of beam spot B1.

Sensor 12 receives light reflected from beam spot B2 shown in FIG. 2 through a lens (not shown). Sensor 13 receives light reflected from beam spot B3 shown in FIG. 2 through a lens (not shown).

The output signal S1A of sensor portion 11A is applied to a noninverting input terminal (+) of differential amplifier 14, and the output signal S1B of sensor portion 11B is applied to an inverting input terminal (−) of differential amplifier 14. The output signal S2 of sensor 12 is applied to an inverting input terminal (−) of differential amplifier 15, and the output signal S3 of sensor 13 is applied to a noninverting input terminal (+) of differential amplifier 15.

The output signal OP1 of differential amplifier 14 is applied to a zero cross detector 16. Zero cross detector 16 generates one pulse when differential amplifier output signal OP1 decreases to zero. Thus generated plurality of pulses are applied to one input terminal of an OR circuit 18 as a zero cross signal ZC1.

Meanwhile, differential amplifier output signal OP2 is applied to zero cross detector 17. Zero cross detector 17 generates one pulse when the output signal OP2 of differential amplifier 15 decreases to zero. Thus generated plurality of pulses are applied to another input terminal of OR circuit 18 as a zero cross signal ZC2.

The track counter circuit further includes a double pulse removing portion 19 for removing one of two serial pulses included in the output signal OR1 of OR circuit 18. Double pulse removing portion 19 includes an AND circuit 20 and a monostable multivibrator (one shot multivibrator) 21.

The output signal OR1 of OR circuit 18 is applied to one input terminal of AND circuit 20, and the output signal AN of AND circuit 20 is applied to monostable multivibrator 21. One output signal $\overline{Q1}$ of monostable multivibrator is applied to another input terminal of AND circuit 20.

The track counter circuit further includes a periodic pulse supplementing portion 21 for supplementing the other output signal Q1 of monostable multivibrator 21 with a prescribed pulse such that output signal Q1 maintains prescribed periodicity. Periodic pulse supplementing portion 22 includes a retriggerable monostable multivibrator 23, a monostable multivibrator 24, and an OR circuit 25.

Retriggerable monostable multivibrator 23 supplies an output signal $\overline{Q2}$ in an L level in a prescribed time period to monostable multivibrator 24, in response to the output signal Q1 of vibrator 21. Monostable multivibrator 24 generates one short pulse in response to the output signal $\overline{Q2}$ of vibrator 23. The generated pulse is applied to one input terminal of OR circuit 25 as output signal Q3. The output signal Q1 of vibrator 21 is also applied to another input terminal of OR circuit 25.

The track counter circuit further includes a counter 26 for counting the number of pulses included in the output signal OR2 of OR circuit 25.

Figure 5:
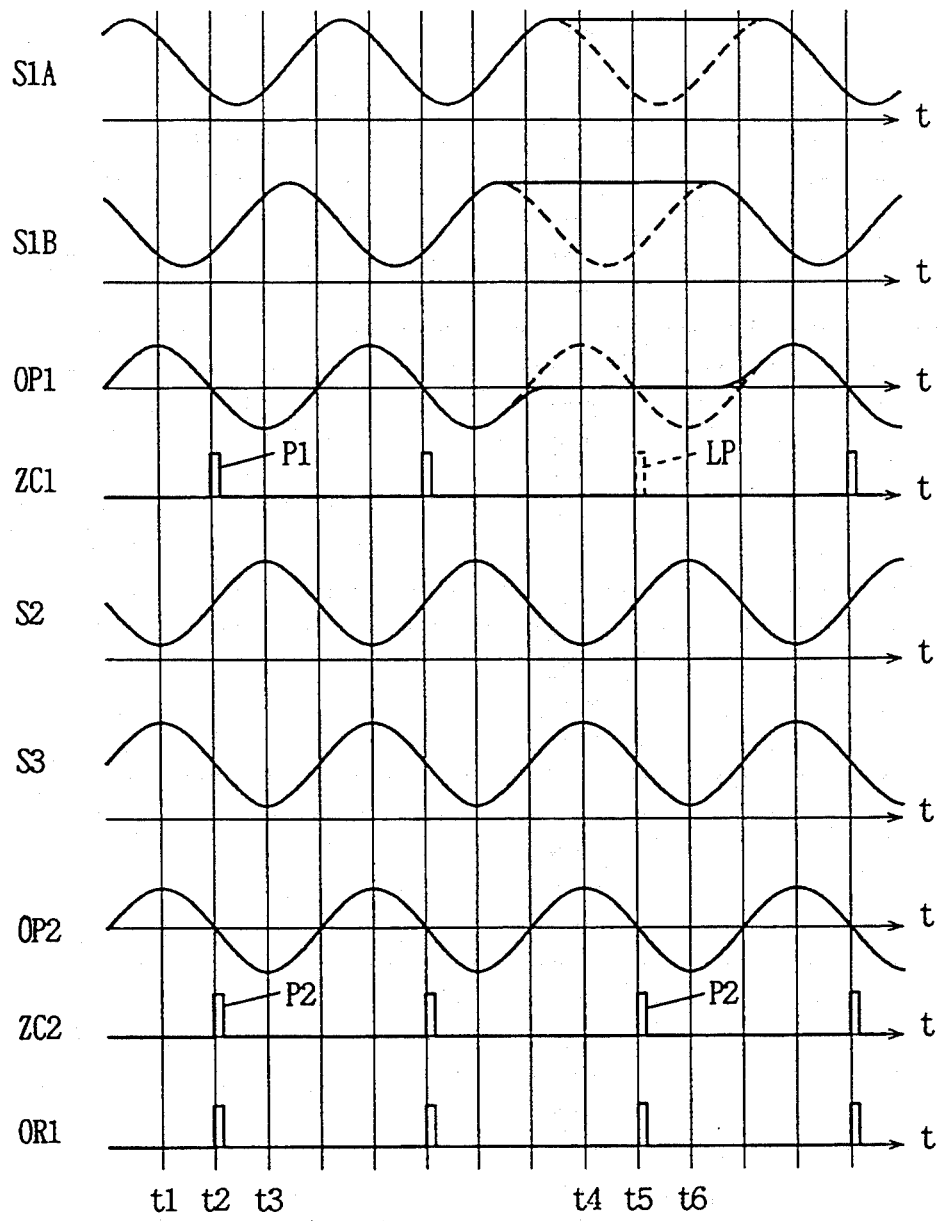
FIG. 5 is a timing chart showing waveforms of output signals from the track counter circuit shown in FIG.

Now, the operation of the track counter circuit will be described in conjunction with FIGS. 3A to 5. FIGS. 3A to 3C and FIGS. 4A to 4C time-sequentially show states in which three beam spots cross tracks in a track retrieval mode. FIG. 5 is a timing chart showing waveforms of output signals shown in FIG. 1 corresponding to the states in FIGS. 3A to 3C and 4A to 4C.

Figure 3C:
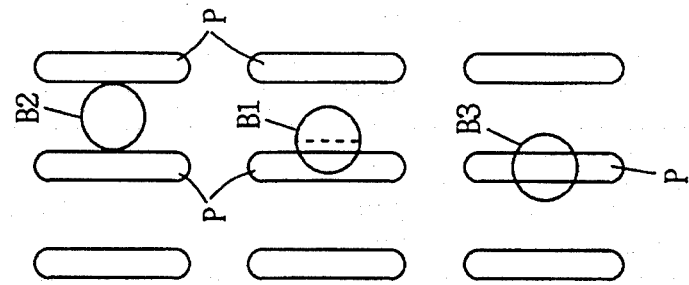
FIGS. 3A, 3B and 3C are plan views for use in illustration of the operation of the track counter circuit shown in FIG. 1, time-sequentially showing a disk surface when a beam spot by a main beam crosses pits.
Figure 3B:
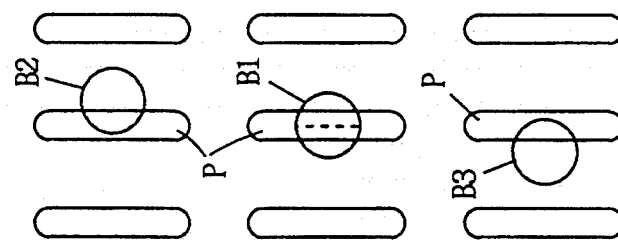
Figure 3A:
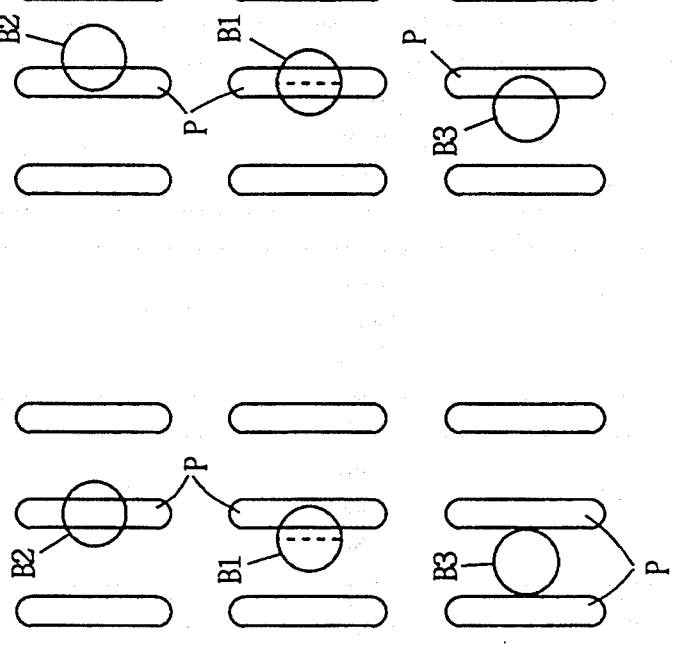

In time t1 in FIG. 3A, since the left half of beam spot B1 is in a space between pits P, in other words at a mirror surface of the disk, a large amount of light reflected therefrom comes into sensor portion 11A. The output signal S1A of sensor portion 11A is therefore large enough. Since the right half of beam spot B1 is on pit P, a small amount of light reflected therefrom comes into sensor portion 11B. The output signal S1B of sensor portion 11B is small enough as a result. Thus, a maximum output signal OP1 is conducted from differential amplifier 14.

Meanwhile, since beam spot B2 is just on pit P, output signal S2 from sensor 12 is at a minimum level. Since beam spot B3 is placed between pits P, the output signal S3 of sensor 13 is at a maximum level. Accordingly, a maximum output signal OP2 is conducted from differential amplifier 15.

In time t2 in FIG. 3B, since beam spot B1 is just on pit P, the output signal OP1 of differential amplifier is at zero level. At the time, zero cross detector 16 generates one short pulse P1. Accordingly, zero cross detector 16 supplies OR circuit 18 with zero cross signal ZC1 formed of a plurality of pulses which is generated when the output signal OP1 of the differential amplifier decreases to zero.

FIG. 6 is a block diagram showing in detail the configuration of zero cross detector 16. Referring to FIG. 6, zero cross detector 16 includes a comparator 161, and a monostable multivibrator 162.

Comparator circuit 161 has an inverting input terminal (−) always provided with a ground potential, and a noninverting input terminal (+) provided with the output signal OP1 of the differential amplifier. Accordingly, as illustrated in the timing chart in FIG. 7, the output OP1a of comparator 161 attains an H level during the period in which the output signal OP1 of the differential amplifier is positive.

Monostable multivibrator 162 generates a short pulse in response to a falling of comparator output OP1a. The series of pulses are conducted as zero cross signal ZC1 from zero cross detector 16.

Referring back to FIG. 3B and FIG. 5, in time t2, beam spot B2 is placed on the inner boundary of pit P, the output signal S2 of sensor 10 attains an intermediate level. Since beam spot B3 is placed on the outer boundary of pit P, the output signal S3 of sensor 13 also attains an intermediate level. The output signal OP2 of differential amplifier 15 is at zero level. Zero cross detector 17 generates one short pulse P2 when the output signal OP2 of the differential amplifier thus decreases to zero.

Zero cross detector 17 is formed similarly to zero cross detector 16 shown in FIG. 6. Accordingly, a zero cross signal ZC2 also formed of a plurality of pulses is conducted from zero cross detector 17. Since these zero cross signals ZC1 and ZC2 are applied to OR circuit 18, one short pulse is conducted from OR circuit 18 as OR output signal OR1.

Now, in time t3 in FIG. 3C, since the left half of beam spot B1 is placed on pit P1 and the right half between pits P, a minimum output signal OP1 is output from differential amplifier 14. Since beam spot B2 is placed between pits P and beam spot B3 is just on pit P, a minimum output signal OP2 is output from differential amplifier 15.

As described above, every time beam spot B1 by the main beam crosses pit P, one short track crossing pulse is output from zero cross detector 16. Every time beam spots B2 and B3 by the sub beams cross pit P, one short track crossing pulse is output from zero cross detector 17. Zero cross signals ZC1 and ZC2 formed of such a plurality of crossing pulses are both supplied to OR circuit 18. Since the pulses included in zero cross signals ZC1 and ZC2 are in phase, an output signal OR1 formed of a plurality of tracking crossing pulses in phase with zero cross signals ZC1 and ZC2 are output from OR circuit 18.

Now, the case in which beam spot B1 by the main beam passes between pits P will be described in conjunction with FIGS. 4A to 5.

In time t4 in FIG. 4A, since beam spot B1 is between pits P, the output signals S1A and S1B of sensor portions 11A and 11B are at maximum levels. The output signal OP1 of the differential amplifier is therefore at zero. Since beam spot B2 is just on pit P and beam spot B3 is between pits P, the output signal OP1 of the differential amplifier has a maximum output.

In time t5 in FIG. 4B, since beam spot B1 is between pits P similarly to the above case, the output signal OP1 of the differential amplifier remains to be at zero.

At the time, if beam spot B1 is on pit P, as illustrated in dotted line in FIG. 5, the output signal OP1 of the differential amplifier should decrease to zero. In such a case, one short pulse LP must be generated for output as zero cross signal ZC1 from zero cross detector 16. However, since the output signal OP1 of the differential amplifier remains to be at zero, such a pulse LP will not be generated.

Meanwhile, since beam spot B2 and B3 are both on boundaries of pits P, the output signal OP2 of differential amplifier is at zero. Accordingly, zero cross detector 17 generates one short pulse P2 and outputs the signal as zero cross signal ZC2.

At the time although a crossing pulse is not applied to the one input terminal of OR circuit 18, a crossing pulse is applied to that another input terminal instead, and therefore one crossing pulse is output from OR circuit 18 as output signal OR1 in response to the applied pulse.

Now, in time t6 in FIG. 4C, since beam spot B1 is between pits similarly to the above case, the output signal OP1 of differential amplifier remains to be at zero. Meanwhile, beam spot B2 is between pits P, beam spot B3 just on pit P, and therefore the output signal OP2 of the differential amplifier is at a minimum level.

As described above, when beam spot B1 by the main beam passes between pits P, even if beam spot B1 crosses the track, a corresponding crossing pulse will not be generated. However, beam spots B2 and B3 by the sub beams both cross pits P, corresponding crossing pulses are generated. Accordingly, such zero cross signal ZC1 without pulse LP is supplemented with a corresponding crossing pulse P2 included in zero cross signal ZC2, and the supplemented signal OR1 is output from OR circuit 18.

In the foregoing, the cases have been described in which crossing pulses included in zero cross signals ZC1 and ZC2 completely coincide, but such crossing pulses cannot be completely synchronized with each other, and in practice as illustrated in the timing chart in FIG. 8, two serial crossing pulses may sometimes be output as OR output signal OR1. If such an output signal OR1 is applied to counter 26, the number of tracks will be erroneously counted.

Double pulse removing portion 19 is provided for solving such a problem. More specifically, when OR output signal OR1 rises when one output signal $\overline{Q1}$ of monostable multivibrator 21 is in an H level, the output signal AN of AND circuit 20 rises in response. In response to the rising of output signal AN, the one output signal $\overline{Q1}$ of monostable multivibrator 21 falls to attain an L level for a prescribed time period, and the other output signal Q1 rises to attain an H level for a prescribed period. In response to the falling of output signal $\overline{Q1}$, the output signal AN of AND circuit 20 falls.

If the output signal OR1 of OR circuit 18 once again rises, the output signal AN of AND circuit 20 does not fall, because output signal $\overline{Q1}$ applied to one input terminal of AND circuit 20 is in an L level. Accordingly, if crossing pulses are serially output from OR circuit 18, double pulse removing portion 19 outputs one pulse corresponding to these two pulses.

With the above-described configuration, signal Q1 formed of a series of complete crossing pulses may be output from double pulse removing portion 19, but in the event that a dropout crossing pulse is still present, such an incomplete signal Q1 is supplemented by periodic pulse supplementing portion 22. More specifically, a crossing pulse included in output signal Q1 has a prescribed cycle T1 as illustrated in FIG. 9. Accordingly, periodic pulse supplementing portion 22 supplements with a crossing pulse which should originally appear according to the periodicity if such a pulse does not appear.

Referring to the timing chart in FIG. 9, in response to a rising of output signal Q1, the output signal $\overline{Q2}$ of retriggerable monostable multivibrator 23 attains an L level during a prescribed time period T2. The prescribed time period T2 is set longer than the cycle T1 of a crossing pulse. Accordingly, output signal Q1 usually rises once again before output signal $\overline{Q2}$ returns to an H level, output signal $\overline{Q2}$ is maintained at L level during the period in which a crossing pulse is periodically applied.

Accordingly, after the elapse of a prescribed time period T2 between generation of a certain crossing pulse and the next crossing pulse is not generated, output signal $\overline{Q2}$ attains an H level. In response to the rising of output signal $\overline{Q2}$, the output signal Q3 of monostable multivibrator 24 rises. Since these output signals Q1 and Q3 are both applied to OR circuit 25, complete crossing pulses are output from OR circuit 25 as output signal OR 2. The output signal OR2 of OR circuit 25 is applied to counter 26, which counts the number of crossing pulses included in output signal OR2.

As described above, since the first embodiment uses the three sensors 11 to 13 in the three-beam type disk player, a counter circuit of a simple configuration can be implemented. Furthermore, if a series of crossing pulses obtained by the main beam lack one or more crossing pulses, a series of crossing pulses obtained by the sub beams supplement such series of pulses, and the number of tracks pickup 10 has crossed can accurately be counted.

In addition, by the provision of double pulse removing portion 19, if two crossing pulses are serially output from OR circuit 18, the number of tracks pickup 10 has crossed can accurately be counted. Furthermore, by the provision of periodic pulse supplementing portion 22, if crossing pulse trains obtained by both main beam and sub beams lack crossing pulses in the same timing, the dropout crossing pulses can be added based on the periodicity, and the number of tracks pickup 10 has crossed can be more accurately counted.

In the first embodiment, double pulse removing portion 19 and periodic pulse supplementing portion 22 are not necessarily provided. More specifically, the output signal OR1 of OR circuit 18 can directly be applied to counter 26. In the embodiment, although zero cross detector 16 generates one crossing pulse when the output signal OP1 of differential amplifier decreases to zero, and zero cross detector 17 generates one crossing pulse when the output signal OP2 of the differential amplifier decreases to zero, zero cross detector 16 may generate one crossing pulse when the output signal OP1 of the differential amplifier increases to zero and zero cross detector 17 may generate one crossing pulse when the output signal OP2 of the differential amplifier increases to zero instead.

Note that sensor 11 in the first embodiment corresponds to the first light receiving element. Sensors 12 and 13 correspond to the second light receiving element. Differential amplifier 14 and zero cross detector 1 correspond to the first signal generator. Differential amplifier 15 and zero cross detector 17 correspond to the second signal generator. OR circuit 18 corresponds to the supplementing element. Double pulse removing portion 19 corresponds to the removing element.

[Second Embodiment]

FIG. 10 is a block diagram showing the configuration of an entire track counter in a disk player according to a second embodiment of the invention. Referring to FIG. 10, the track counter circuit is substantially identical to the first embodiment except that the output signal S2 of sensor 12 is applied to zero cross detector 17 through a DC cut filter 27, that the output signal ZC2 of zero cross detector 17 is applied to one input terminal of a three-input OR circuit 30, that the output signal S3 of sensor 13 is applied to a zero cross detector 29 through a DC cut filter 28, and that the output signal ZC3 of zero cross detector 29 is applied to another input terminal of an OR circuit 30.

DC cut filter 27 is formed of a capacitor 271 and a resistor 272, and blocks only a DC component in the output signal S2 of sensor 12. Stated differently, only the AC component in output signal S2 is supplied to zero cross detector 17.

DC cut filter 28 is formed of a capacitor 281 and a resistor 282, and blocks only the DC component of the output signal S3 of sensor 13. Stated differently, only the AC component of output signal S3 is supplied to zero cross detector 29. Zero cross detector 29 has a similar configuration to zero cross detector 16.

The operation of the counter circuit will be described in conjunction with FIGS. 11A to 13.

FIGS. 11A to 11C time-sequentially illustrate the state in which all the three beam spots cross pits. In time t1 in FIG. 11A, since beam spot B1 is on the outer boundary of pit P, the output signal OP1 of differential amplifier 14 is at a maximum level. Since beam spot B2 is just on pit P, the output signal S2 of sensor 12 is at a minimum level. Since beam spot B3 is between pits P, the output signal S3 of sensor 13 is at a maximum level.

In time t2 in FIG. 11B, since beam spot B1 is just on pit P, the output signal OP1 of differential amplifier 14 is at zero. Since beam spot B2 is on the inner boundary of pit P, the output signal S2 of sensor 12 attains an intermediate level. Since beam spot B3 is on the outer boundary of pit P, the output signal S3 of sensor 13 also attains an intermediate level.

In time t3 in FIG. 11C, since beam spot B1 is on the boundary of pit P, the output signal OP1 of differential amplifier 14 is at a minimum level. Since beam spot B2 is between pits P, the output signal S2 of sensor 12 is at a maximum level. Since beam spot B3 is just on pit P, the output signal S3 of sensor 13 is at a minimum level.

Zero cross detector 16 generates one short pulse P1 in time t2 when output signal OP1 decreases to zero. Zero cross signal ZC1 formed of a train of such track crossing pulses is applied to OR circuit 30.

Herein, beam spot B2 is irradiated upon a position ¼ track pitch D/4 shifted inward from first beam spot B1, while beam spot B3 is irradiated upon a position ¼ track pitch D/4 shifted outward from first beam spot B1, and therefore the phase of output signal S2 of sensor 12 is advanced from the phase of output signal S3 of sensor 13 by ½ cycle.

The output signal S2 of sensor 12 has its DC component DC removed by DC cut filter 27 and supplied to zero cross detector 17. The output signal S3 of sensor 13 has its DC component DC removed by DC cut filter 28 and supplied to zero cross detector 29. Accordingly, when the output signal OP1 of differential amplifier 14 decreases to zero, the output signal (not shown) of DC cut filter 27 increases to zero, while the output signal (not shown) of DC cut filter 28 decreases to zero.

Zero cross detector 17 generates one short crossing pulse P2 when the output signal of DC cut filter 27 increases to zero. A crossing pulse train generated by zero cross detector 17 is supplied to OR circuit 30 as zero cross signal ZC2. Zero cross detector 29 generates one short crossing pulse P3 when the output signal of DC cut filter 28 decreases to zero. The crossing pulse train generated by zero cross detector 29 is supplied to OR circuit 30 as zero cross signal ZC3. The crossing pulses in zero cross signals ZC1 and ZC3 are generated in the same timing.

FIGS. 12A to 12C time-sequentially show how beam spots pass between pits. In time t4 in FIG. 12A, since beam spot B1 is between pits P, the output signal OP1 of differential amplifier 14 is at zero. Since beam spot B2 is just on pit P, the output signal S2 of sensor 12 is at a minimum level, since beam spot B3 is between pits P, the output signal S3 of sensor 13 is at a maximum level.

In time t5 in FIG. 12B, since beam spot B1 is between pits P, the output signal OP1 of differential amplifier 14 is maintained at zero. Since beam spot B2 is on the inner boundary of pit P, the output signal S2 of sensor 12 attains an intermediate level. Since beam spot B3 is on the outer boundary of pit P, the output signal S3 of sensor 13 attains an intermediate level.

In time t6 in FIG. 12C, since beam spot B1 is between pits P, the output signal OP1 of differential amplifier 14 is maintained at zero. Since beam spot B2 is between pits P, the output signal S2 of sensor 12 attains a maximum level. Since beam spot B3 is just on pit P, the output signal S3 of sensor 13 attains a minimum level.

In this case, beam spot B1 through crossing a track, passes between pits P, a crossing pulse LP is not generated. However, when beam spot B2 crosses the track, zero cross detector 17 generates a corresponding crossing pulse P2. Also when beam spot B3 crosses the track, zero cross detector 29 generates a corresponding crossing pulse P3.

The output signals ZC1, ZC2 and ZC3 of zero cross detectors 16, 17 and 29 are applied to OR circuit 30, and therefore if crossing pulses included in any of zero cross signals ZC1 to ZC3, OR circuit 30 outputs a corresponding one crossing pulse. A crossing pulse train from OR circuit 30 is supplied to double pulse removing portion 19 as OR output signal OR2.

Double pulse removing portion 19 and periodic pulse supplementing portion 22 are substantially identical to those in the first embodiment with a detailed description thereof being omitted. In the second embodiment, the output signal S2 of sensor 12 is applied to OR circuit 30 through DC cut filter 27 and zero cross detector 17, and therefore even if beam spot B1 formed by the main beam passes between pits P, the number of tracks pickup 10 has crossed can accurately be counted.

Also in the second embodiment, since the output signal of sensor 13 is applied to OR circuit 30 through DC cut filter 28 and zero cross detector 29, even if beam spot B1 passes between pit P and beam spot B2 formed by the sub beam passes between pits P, the number of tracks pickup 10 has crossed can accurately be counted.

If sensor 13, DC cut filter 28 and zero cross detector 29 in the second embodiment are not provided, the number of tracks pickup 10 has crossed can be counted more accurately than conventional. Similarly, sensor 12, DC cut filter 27 and zero cross detector 17 may not be necessarily provided. Similarly, sensor 11, differential amplifier 14 and zero cross detector 16 may be omitted. More specifically, a crossing pulse train generated in response to light reflected from at least two beam spots need only be applied to an OR circuit.

Also in this second embodiment, zero cross detector 16 generates one crossing pulse when the output signal OP1 of the differential amplifier decreases to zero, zero cross detector 17 generates one crossing pulse when the output signal of DC cut filter 27 increases to zero, and zero cross detector 29 generates one crossing pulse when the output signal of DC cut filter 28 decreases to zero, but zero cross detector 16 may generate one crossing pulse when the output signal OP1 of the differential amplifier increases to zero, zero cross detector 17 may generate one crossing pulse when the output signal of DC cut filter 27 decreases to zero, and zero cross detector 29 may generate one crossing pulse when the output signal of DC cut filter 28 increases to zero.

In this embodiment sensor 11 corresponds to the first light receiving element. Sensor 12 corresponds to the second light receiving element. Sensor 13 corresponds to the third light receiving element. Differential amplifier 14 and zero cross detector 16 correspond to the first signal generator. DC cut filter 27 and zero cross detector 17 correspond to the second signal generator. DC cut filter 28 and zero cross detector 29 correspond to the third signal generator.

[Third Embodiment]

FIG. 14 is a block diagram showing the configuration of an entire track counter circuit in a disk player according to a third embodiment of the invention. The third embodiment is an application of the present invention to a two-beam type disk player.

In the two-beam type disk player, as illustrated in FIG. 15, two beam spots B4 and B5 are formed on one track. Beam spot B4 in the front is for recording pit P, and the following beam spot B5 is for monitoring the recorded pit P.

Referring to FIGS. 14 and 15, beam spots B4 and B5 are irradiated at a prescribed distance apart from each other in a direction in which tracks run (Y direction). Sensor 11 in pickup 10 receives light reflected from beam spot B4. Sensor 12 receives light reflected from beam spot B5.

Sensor 11 is divided into two sensor portions 11A and 11B. Sensor portion 11A receives light reflected from the outer half of beam spot B4. Sensor portion 11B receives light reflected from the inner half of beam spot B4.

Sensor 12 is divided into two sensor portions 12A and 12B. Sensor portion 12A receives light reflected from the outer half of beam spot B5. Sensor portion 12B receives light reflected from the inner half of beam spot B5.

The output signal S1A of sensor portion 11A is applied to a noninverting input terminal (+) of differential amplifier 14. The output signal S1B of sensor portion 11B is applied to an inverting input terminal (−) of differential amplifier 14. The output signal S2A of sensor portion 12A is applied to a noninverting input terminal (+) of operation amplifier 15. The output signal S2B of sensor portion 12B is applied to an inverting input terminal (−) of differential amplifier 15.

Zero cross detectors 16 and 17, OR circuit 18, double pulse removing portion 19, periodic pulse supplementing portion 22, and counter 26 are substantially identical to those in the first embodiment with a detailed description thereof being omitted.

The operation of the pulse counter circuit will be described in conjunction with FIGS. 16A to 18. FIGS. 16A to 16C and 17A to 17C time-sequentially show how the two beam spots cross a track. FIG. 18 is a timing chart showing waveforms of output signals corresponding to the states shown in FIGS. 16A to 16C and 17A to 17C.

FIGS. 16A to 16C show how beam spots B4 and B5 cross pits P. In time t1 in FIG. 16A, since beam spot B4 is on the outer boundary of pit P, the output signal OP1 of operation amplifier 14 attains a maximum level. Beam spot B5 is also on the outer boundary of pit P, and therefore, the output signal OP2 of differential amplifier 15 attains a maximum level.

In time t2 in FIG. 16B, since beam spot B4 is just on pit P, the output signal OP1 of differential amplifier 14 is at zero. Since beam spot B5 is just on pit P, the output signal OP2 of differential amplifier 15 is also at zero.

In time t3 in FIG. 16C, since beam spot B4 is on the inner boundary of pit P, the output signal OP1 of differential amplifier 14 attains a minimum level. Since beam spot B5 is also on the inner boundary of pit P, the output signal OP2 of differential amplifier 15 attains a minimum level.

Zero cross detector 16 generates one short crossing pulse P1 when the output signal OP1 of differential amplifier 14 decreases to zero. Such a crossing pulse is generated every time beam spot B4 crosses pit P. A crossing pulse train thus generated by zero cross detector 16 is supplied to OR circuit 18 as zero cross signal ZC1.

Zero cross detector 17 generates one short crossing pulse P2 when the output signal OP2 of differential amplifier 15 decrease to zero. Such a crossing pulse is generated every time beam spot B5 crosses pit P. A crossing pulse train generated by zero cross detector 17 is supplied to OR circuit 18 as zero cross signal ZC2.

FIGS. 17A to 17C show how beam spot B4 passes between pits even while its crossing a track. In time t4, in FIG. 17A, since beam spot B4 is between pits P, the output signal OP1 of differential amplifier 14 is at zero. Beam spot B5 is on the outer boundary of pit P, and therefore the output signal OP2 of differential amplifier 15 attains a maximum level. In time t5 in FIG. 17B, since beam spot B4 is between pits P, the output signal OP1 of differential amplifier 14 is maintained at zero. Since beam spot B5 is just on pit P, the output signal OP2 of differential amplifier 15 is at zero.

In time t6 in FIG. 18C since beam spot B4 is between pits P, the output signal OP1 of differential amplifier 14 is maintained at zero. Beam spot B5 is on the inner boundary of pit P, and therefore the output signal OP2 of differential amplifier 15 attains a minimum level.

As described above, beam spot B4 while its crossing the tracks still passes between pits P, and therefore the output signal OP1 of differential amplifier 14 is maintained at zero. Accordingly, a crossing pulse LP is not generated by zero cross detector 16. However, beam spot B5 crosses pit P, and therefore zero cross detector 17 generates one short crossing pulse P2 when the output signal OP2 of differential amplifier 15 decreases to zero.

Since the output signals ZC1 and ZC2 of zero cross detectors 16 and 17 are both applied to OR circuit 18, and therefore zero cross signal ZC1 lacking a crossing pulse LP is supplemented with zero cross signal ZC2. The supplemented zero cross signal ZC1 is output from OR circuit 18 as OR output signal OR1. OR signal OR1 is supplied to counter 26 through double pulse removing portion 19 and periodic pulse supplementing portion 22. Double pulse removing portion 19 and periodic pulse supplementing portion 22 operate similarly to those in the first embodiment and therefore a detailed description thereof will not be provided here.

Sensors 11 and 12 in the third embodiment are those of the two-beam type disk player, and therefore a track counter circuit of a simple configuration is implemented. Furthermore, since zero cross signals ZC1 and ZC2 generated in response to two sensors 11 and 12 are supplied to OR circuit 18, one of beam spots B4 and B5 passes between pits P even while crossing the track, and therefore a possible dropout pulse in zero cross signal ZC1 or ZC2 can be supplemented with the other zero cross signal, making it possible to accurately count the number of tracks pickup 10 has crossed.

Note that sensor 11 in the third embodiment corresponds to the first light receiving element. Sensor 12 corresponds to the second light receiving element.

[Fourth Embodiment]

FIG. 19 is a block diagram showing the configuration of an entire track counter circuit in a disk player according to a fourth embodiment of the invention. The track counter is an application of the present invention to a disk player capable of reproducing two channels at a time.

In such a two-channel reproduction type disk player, as illustrated in FIG. 20, one track is irradiated with a laser beam for reproduction to form beam spot B6, and an adjacent track is also irradiated with a laser beam for reproduction to form beam spot B7.

Sensors 11 and 12 receive light reflected from these beam spots B6 and B7. Beam spots B6 and B7 are irradiated to positions one track pitch D apart from each other in a direction crossing tracks (X direction). Thus, in a normal reproduction mode, information recorded on two tracks can be reproduced at a time.

Beam spots B6 and B7 may be emitted upon positions two track pitches 2D, three track pitches 3D or more apart from each other.

The fourth embodiment is different from the third embodiment in that beam spots B6 and B7 are irradiated in the direction crossing the tracks (X direction), not in the direction in which the tracks run (Y direction).

Now, the operation of the track counter circuit will be described in conjunction with FIGS. 21A to 23. FIGS. 21A to 21C and 22A to 22C time-sequentially show how the two beam spots cross the tracks in a retrieval mode. FIG. 23 is a timing chart showing waveforms of output signals corresponding to the states shown in FIGS. 21A to 21C and 22A to 22C.

The case in which beam spots B6 and B7 both cross pits P will be considered. In time t1 in FIG. 21A, since beam spot B6 is on the outer boundary of pit P, the output signal OP1 of differential amplifier 14 attains a maximum level. Since beam spot B7 is also on the outer boundary of an adjacent pit P, the output signal OP2 of differential amplifier 15 attains a maximum level. In time t7 in FIG. 21B, since beam spot B6 is just on pit P, the output signal OP1 of differential amplifier 14 is at zero. Since beam spot B7 is just on an adjacent pit P, the output signal OP2 of differential amplifier 15 attains a zero level.

In time t3 in FIG. 21C, since beam spot B6 is on the inner boundary of pit P, the output signal OP1 of differential amplifier 14 attains a minimum level. Since beam spot B7 is also on the inner boundary of an adjacent pit P, the output signal OP2 of differential amplifier 15 attains a minimum level.

Zero cross detector 16 generates one crossing pulse P1 when the output signal OP1 of differential amplifier 14 decreases to zero. A plurality of crossing pulses thus generated by zero cross detector 16 are applied to OR circuit 18 as zero cross signal ZC1.

Zero cross detector 17 generates one crossing pulse P2 when the output signal OP2 of differential amplifier 15 decreases to zero. A plurality of crossing pulses thus generated by zero cross detector 17 are applied to OR circuits 18 as zero cross signal ZC2.

When one beam spot passes between pits, in time t4 in FIG. 22A, since beam spot B6 is between pits P, the output signal OP1 of differential amplifier 14 is at zero. Since beam spot B7 is on the outer boundary of pit P, the output signal OP2 of differential amplifier 15 attains a maximum level.

In time t5 in FIG. 22B, since beam spot B6 is between pits P, the output signal OP1 of differential amplifier 14 is maintained at zero. Beam spot B7 is just on pit P, and therefore, the output signal OP2 of differential amplifier 15 is at zero.

In time t6 in FIG. 22C, since beam spot B6 is between pit P, the output signal OP1 of differential amplifier 14 is maintained at zero. Beam spot B7 is on the inner boundary of pit P, and therefore the output signal OP2 of differential amplifier 15 attains a minimum level.

When beam spot B6 crosses a pit, as illustrated in dotted line in FIG. 23, in time t5 the output signal OP1 of differential amplifier 14 decreases to zero, and therefore zero cross detector 16 is supposed to generate one crossing pulse LP. However, since beam spot B6 passes between pits P, zero cross detector 16 does not generate such a crossing pulse LP in time t5.

Meanwhile, beam spot B7 crosses pit P, and therefore the output signal OP2 of differential amplifier 15 decreases to zero. Accordingly, zero cross detector 17 generates one crossing pulse P2 in time t5.

Accordingly, OR circuit 18 outputs one crossing pulse every time one of the beam spots crosses the tracks. A plurality of crossing pulses from OR circuits 18 are supplied as OR output signal to counter 26 through double pulse removing portion 19 and periodic pulse supplementing portion 22. Since double pulse removing portion 19 and periodic pulse supplementing portion 22 operate similarly to those in the first embodiment, a detailed description thereof will not be provided here.

Since sensors 11 and 12 in the track counter circuit are those used in the two-channel reproduction type disk player, a track counter circuit of a simple configuration can be implemented. Furthermore, even if one beam spot passes between pits P and a desired crossing pulse is not generated, the dropout crossing pulse can be supplemented with a crossing pulse generated when the other beam spot crosses a pit, and therefore the number of tracks pickup 10 has crossed can be accurately counted.

Note that sensor 11 in the fourth embodiment corresponds to the first light receiving element. Sensor 12 corresponds to the second light receiving element.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of counting the number of tracks on a disk, comprising the steps of:
   scanning the disk with a plurality of optical beams in a direction crossing the tracks;
   receiving first light reflected from one of a plurality of beam spots formed on a surface of the disk by said plurality of optical beams;
   receiving second light reflected from another one of said plurality of beam spots;
   generating a first signal formed of a plurality of pulses in response to said first reflected light;
   generating a second signal formed of a plurality of pulses in response to said second reflected light;
   supplementing said first signal with a pulse included in said second signal corresponding to a certain pulse missing in said first signal; and
   counting the pulses of the supplemented first signal.

2. A track counter circuit in a disk player scanning a disk with a plurality of optical beams in a direction crossing tracks, comprising:
   first light receiving means for receiving light reflected from at least one of a plurality of beam spots formed on a surface of the disk by said plurality of optical beams;
   second light receiving means for receiving light reflected from at least another one of said plurality of beam spots;
   first signal generation means responsive to said first light receiving means for generating a first signal formed of a plurality of pulses;
   second signal generation means responsive to said second light receiving means for generating a second signal formed of a plurality of pulses;
   supplementing means for supplementing said first signal with a pulse included in said second signal corresponding to a certain pulse missing in said first signal; and
   count means for counting the pulses of the first signal supplemented by said supplementing means.

3. The track counter circuit as recited in claim 2, wherein
   said first light receiving means includes first and second sensors receiving light reflected from a first beam spot of said plurality of beam spots, said first sensor receiving light reflected from a half of said first beam spot on the outer side of the disk, said second sensor receiving light reflected from the remaining half of said first beam spot on the inner side of the disk;
   said second light receiving means including,
   a third sensor receiving light reflected from a second beam spot positioned apart from said first beam spot at a prescribed distance in one direction along the tracks and at a prescribed distance in one direction crossing the tracks, and
   a fourth sensor receiving light reflected from a third beam spot positioned apart from said first beam spot at a prescribed distance in the other direction along the tracks and at a prescribed distance in the other direction crossing the tracks,
   said first signal generation means includes,
   first comparison means for comparing the output of said first sensor and the output of said second sensor with each other,
   first zero cross detection means responsive to said first comparison means for generating one pulse when the output of said first sensor decreases and the output of said second sensor increases to such a level that the outputs of said first and second sensors are equal to each other, or when the output of said first sensor increases and the output of said second sensor decreases to such a level that the outputs of said first and second sensors are equal to each other, and
   said second signal generation means includes,
   second comparison means for comparing the output of said third sensor and the output of said fourth sensor with each other, and
   second zero cross detection means responsive to said second comparison means for generating one pulse when the output of said third sensor decreases and the output of said fourth sensor increases to such a level that the outputs of said third and fourth sensors are equal to each other or when the output of said third sensor increases and the output of said fourth sensor decreases to such a level that the outputs of said first and second sensors are equal to each other.

4. The track counter circuit as recited in claim 3, wherein
   said supplementing means includes a logical sum circuit receiving said first and second signals.

5. The track counter circuit as recited in claim 3, further comprising removing means for, when the first signal supplemented by said supplementing means includes two pulses in a prescribed time period, removing one of said two pulses.

6. The track counter circuit as recited in claim 2, further comprising:
   third light receiving means for receiving light reflected from at least another one of said plurality of beam spots; and
   third signal generation means responsive to said third light receiving means for generating a third signal formed of a plurality of pulses,
   said supplementing means supplementing said first signal with a pulse included in said third signal corresponding to a certain pulse missing in said first signal.

7. The track counter circuit as recited in claim 6, wherein
   said first light receiving means includes first and second sensors receiving light reflected from a first beam spot of said plurality of beam spots, said first sensor receiving light reflected from a half of said first beam spot on the outer side of the disk, said second sensor receiving light reflected from the remaining half of said first beam spot on the inner side of the disk;

said second light receiving means includes a third sensor receiving light reflected from a second beam spot positioned apart from the first beam spot at a prescribed distance in one direction along the tracks and at ¼ a track pitch in one direction crossing the tracks, said first signal generation means includes, first comparison means for comparing the output of said first sensor and the output of the second sensor with each other, and first zero cross detection means responsive to said first comparison means for generating one pulse at a first timing when the output of said first sensor decreases and the output of said second sensor increases to such a level that the outputs of said first and second sensor are equal to each other or at a second timing when the output of said first sensor increases and the output of said second sensor decreases to such a level that the outputs of said first and second sensors are equal to each other, said second signal generation means includes, first filter means for removing a DC component from the output of said third sensor, and second zero cross detection means for generating one pulse when the output of said first filter means increases to zero in a first case in which said first zero cross detection means generates the pulse at the first timing, and generating one pulse when the output of said first filter means decreases to zero in a second case in which said first zero cross detection means generates the pulse at the second timing, said third light receiving means includes a fourth sensor receiving light reflected from a third beam spot positioned apart from said first beam spot at a prescribed distance in the other direction along the tracks and at ¼ the track pitch in which in the other direction crossing the tracks, and said third signal generation means includes, second filter means for removing a DC component from the output of said fourth sensor, and third zero cross detection means for generating one pulse when the output of said second filter means decreases to zero in said first case and generating one pulse when the output of said second filter means increase to zero in said second case.

8. The track counter circuit as recited in claim 7, wherein
said supplementing means includes a logical sum circuit receiving said first to third signals.

9. The track counter circuit as recited in claim 7, further comprising removing means for, when the first signal supplemented by said supplementing means includes two pulses in a prescribed time period, removing one of said two pulses.

10. A track counter circuit as recited in claim 2, wherein
said first light receiving means includes first and second sensors receiving light reflected from a first beam spot of said plurality of beam spots, said first sensor receiving light reflected from a half of said first beam spot on the outer side of the disk, said second sensor receiving light reflected from the remaining half of said first beam spot on the inner side of the disk;

said second light receiving means includes third and fourth sensors receiving light reflected from a second beam spot of said plurality of beam spots, said third sensor receiving light reflected from a half of said second beam spot on the outer side of the disk, said fourth sensor receiving light reflected from the remaining half of said second beam spot on the inner side of the disk, said first signal generation means includes, first comparison means for comparing the output of said first sensor and the output of said second sensor with each other, and first zero cross detection means responsive to said first comparison means for generating one pulse when the output of said first sensor decreases and the output of said second sensor increases to such a level that the outputs of said first and second sensors are equal to each other or when the output of said first sensor increases and the output of said second sensor decreases to such a level that the outputs of said first and second sensors are equal to each other, and said second signal generation means includes, second comparison means for comparing the output of said third sensor and the output of said fourth sensor with each other, and second zero cross detection means responsive to said second comparison means for generating one pulse when the output of said third sensor decreases and the output of said fourth sensor increases to such a level that the outputs of said third and fourth sensors are equal to each other or when the output of said third sensor increases and the output of said fourth sensor decreases to such a level that the outputs of said third and fourth sensors are equal to each other.

11. The track counter circuit as recited in claim 10, wherein
said first beam spot is positioned apart from said second beam spot at a prescribed distance in a direction along the tracks.

12. The track counter circuit as recited in claim 11, wherein
said supplementing means includes a logical sum circuit receiving said first and second signals.

13. The track counter circuit as recited in claim 11, further comprising removing means for, when the first signal supplemented by said supplementing means includes two pulses in a prescribed time period, removing one of said two pulses.

14. The track counter circuit as recited in claim 10, wherein said first beam spot is positioned apart from said second beam spot at one or more track pitches in a direction crossing the tracks.

15. The track counter circuit as recited in claim 14, wherein
said supplementing means includes a logical sum circuit receiving said first and second signals.

16. The track counter circuit as recited in claim 14, further comprising removing means for, when the first signal supplemented by said supplementing means includes two pulses in a prescribed time period, removing one of said two pulses.

* * * * *